(12) United States Patent
Coppola, III

(10) Patent No.: US 7,464,052 B1
(45) Date of Patent: Dec. 9, 2008

(54) PORTFOLIO ACCOUNTING AND RISK MANAGEMENT SYSTEM

(75) Inventor: James P. Coppola, III, San Francisco, CA (US)

(73) Assignee: Trading Research Design, Inc., Sarasota, FL (US)

( * ) Notice: Subject to any disclaimer, the term of this patent is extended or adjusted under 35 U.S.C. 154(b) by 1066 days.

(21) Appl. No.: 09/587,619

(22) Filed: Jun. 5, 2000

Related U.S. Application Data

(60) Provisional application No. 60/137,690, filed on Jun. 4, 1999.

(51) Int. Cl.
*G06Q 40/00* (2006.01)
(52) U.S. Cl. .......................................... 705/35; 705/36
(58) Field of Classification Search .................. 705/37, 705/35–36
See application file for complete search history.

(56) References Cited

U.S. PATENT DOCUMENTS

| | | | | |
|---|---|---|---|---|
| 4,677,933 | A * | 7/1987 | Rotella | 116/313 |
| 5,812,987 | A * | 9/1998 | Luskin et al. | 705/36 |
| 5,812,988 | A * | 9/1998 | Sandretto | 705/36 |
| 5,918,217 | A | 6/1999 | Maggioncalda et al. | 705/36 |
| 6,012,044 | A | 1/2000 | Maggioncalda et al. | 705/36 |
| 6,021,397 | A * | 2/2000 | Jones et al. | 705/36 |
| 6,078,904 | A * | 6/2000 | Rebane | 705/36 |
| 6,085,175 | A * | 7/2000 | Gugel et al. | 705/36 |
| 6,088,685 | A | 7/2000 | Kiron et al. | 750/36 |
| 6,125,355 | A | 9/2000 | Bekaert et al. | 705/36 |
| 6,247,000 | B1 | 6/2001 | Hawkins et al. | 705/37 |
| 6,275,814 | B1 * | 8/2001 | Giansante et al. | 705/36 |
| 6,292,787 | B1 * | 9/2001 | Scott et al. | 705/36 |
| 6,401,080 | B1 | 6/2002 | Bigus et al. | 705/37 |

FOREIGN PATENT DOCUMENTS

JP 11259559 A * 9/1999

OTHER PUBLICATIONS

Walsh, S.; Merges, M.; Kirchhoff, B.; Morabito, J.; "Portfolio management for the commercialization of advanced technologies"; Engineering and Technology Management, 1998. Pioneering New Technologies: Management Issues and Challenges in the Third Millennium. IEMC '98 Proceedings; International Conference on Oct. 11-13, 1998; pp. 452-456.*

(Continued)

*Primary Examiner*—Thu Thao Havan
(74) *Attorney, Agent, or Firm*—Weingarten, Schurgin, Gagnebin & Lebovici LLP

(57) ABSTRACT

A method and system for managing investment portfolio risk on a computer system. A plurality of parameters, including an identifier, a market price, a stop-loss price, a commission, a skid, and a number of shares or contracts all associated with an investment instrument, are stored on a computer-readable medium, along with an equity value associated with a user's portfolio. A point risk value is determined for a potential investment. The point risk value is an intermediate value multiplied by the number of shares or contracts, the intermediate value comprising the market price minus the stop-loss price plus the commission plus the skid (for long transactions). A plurality of risk scenarios are displayed showing proposed numbers of shares or contracts associated with the point risk value for a plurality of selected size risk values. Other risk characteristics may also be determined and displayed.

18 Claims, 26 Drawing Sheets

OTHER PUBLICATIONS

Carter, J; "Reducing cycle time by optimizing your product portfolio"; Innovation in Technology Management—The Key to Global Leadership. PICMET '97: Portland International Conference on Management and Technology; Jul. 27-31 1997; pp. 431-434.*

Kira, D.S.; Kisy, M.I.; Murray, D.H.; Goranson, B.J.; "A specific decision support system (SDSS) to develop an optimal project portfolio mix under uncertainty"; Engineering Management, IEEE Transactions on vol. 37, Issue 3, Aug. 1990; pp. 213-221.*

*Are Investors Reluctant To Realize Their Losses?*, Terrance Odean, University of California Davis Graduate School of Management, Jul. 1998.

Tip-offs from top traders, Ginger Szala et al., *Futures*, "Managed Money", Jul. 1994, pp. 54 & 56.

Determining Optimal Risk, Ed Seykota et al., *Technical Analysis of Stocks & Commodities*, "Money Management", 1993.

Of Dubious Origin, But Valuable, Ed Seykota, *Technical Securities Analysts Association of San Francisco Newsletter*, Jan.-Mar. 1994, p. 2.

The Elements of Successful Trading, Van K. Tharp, Ph.D., *Technical Securities Analysts Assocation of San Francisco Newsletter*, Jan.-Mar. 1994, p. 2.

Balancing Act, Mike DeAmicis-Roberts, *Futures*, "Trading Techniques", Sep. 1995, pp. 46-47.

Fine tuning money management with f, Murray A. Ruggiero Jr., *Futures*. "Technology and Trading", Sep. 1995, pp. 48-50.

*Sheldon Knight: Patience as a Virtue*, Mark Etzkorn, www.futuresmag.com. "Trade Profile", Apr., 1998.

A "Scenario Planning" Approach To Optimal Money Management, Ralph Vince, *MTA Journal*, Summer 1993, pp. 14-21.

Value at Risk and Technical Analysis, Luis Ballescá, *Technical Analysis of Stocks & Commodities*. "Novice Trader", Aug. 1999, pp. 40 & 43.

* cited by examiner

Size-It™

Sizing your Order - testing    _ □ ×

Security:   Stock/MF ▶
Sizing:   Long ▶

| | |
|---|---|
| Symbol: | IBM |
| Price: | 108.500000 |
| Stop: | 90.000000 |
| Skid: | 1.000 |
| Commission: | 0.181 |
| Point Risk: | 19.681000 |
| Equity-Planned Risk: | $61,970.05 |
| R/E: | 1.43% |
| Risk to Position: | 0.00% |
| Buying Power: | $112,875.00 |
| Cash: | $50,000.00 |

[Print/Fax] [Clear]    [Calc] [Port] [?]

IBM International Business Machines

| New R/E | Size % Risk | Shares | Market Value | Buy Power |
|---|---|---|---|---|
| 4.18% | 2.75% | 87 | $9,439 | 103,435 |
| 4.43% | 3.00% | 94 | $10,199 | 102,676 |
| 4.68% | 3.25% | 102 | $11,067 | 101,808 |
| 4.93% | 3.50% | 110 | $11,935 | 100,940 |
| 5.18% | 3.75% | 118 | $12,803 | 100,072 |
| 5.43% | 4.00% | 126 | $13,671 | 99,204 |
| 5.68% | 4.25% | 134 | $14,539 | 98,336 |
| 5.93% | 4.50% | 142 | $15,407 | 97,468 |
| 6.18% | 4.75% | 150 | $16,275 | 96,600 |
| 6.43% | 5.00% | 157 | $17,034 | 95,840 |
| 7.43% | 6.00% | 189 | $20,506 | 92,368 |
| 8.43% | 7.00% | 220 | $23,870 | 89,005 |
| 9.43% | 8.00% | 252 | $27,342 | 85,533 |
| 10.43% | 9.00% | 283 | $30,705 | 82,169 |
| 11.43% | 10.00% | 315 | $34,177 | 78,697 |
| 13.93% | 12.50% | 394 | $42,749 | 70,126 |
| 16.43% | 15.00% | 472 | $51,212 | 61,663 |
| 18.93% | 17.50% | 551 | $59,783 | 53,091 |
| 21.43% | 20.00% | 630 | $68,355 | 44,542 |

*FIG. 9*

Order Ticket - testing

Trade-It™
Order Ticket

| | | Trade Date | 06/04/2000 | Time | 22:58 |
|---|---|---|---|---|---|
| S/F/O | Stock/MF ▶ | Settle Date | 06/07/2000 | | |
| Symbol | IBM | Transaction | Buy ▶ | | |
| | IBM International Business Machines | Shares | 102 | Price | 106.50000 |
| | | | | Cost: | $-10,881.46 |
| Stop | 90.00000 | Alert | 95.00000 ▲ | Stop Expires on | 07/04/2000 |
| Broker | JC3 ▶ | Commission - per shr | 0.18098 | Lump Sum | 18.46 |
| Limit Alarm: Lower | 92.00000 | Upper | 115.00000 | ☐ Agy Cr. | |

Portfolio   NO POSITIONS FOUND
Positions/Stops:

| Risk to Equity: | Trade | | Position | |
|---|---|---|---|---|
| | 2.71% | $1,706 | 2.71% | $1,706 |

Your Current Buying Power is:      $112,875.00
Your New Buying Power Will Be:    $101,975.08
Your Current Portfolio Risk is:      1.44%

[Print] [Submit] [Cancel]

*FIG. 11*

Track-It™  
Portfolio - MoneyMaximizer Sample Trade

Stocks/Options/Mutual Funds

Equity - Planned Risk: $-16,486.75  
Buying Power: $94,670.93  
Cash: $28,000.00

Bulls

| Stock | Shrs/Cont | Cost Basis | Last | Stop | %R/E | Risk | Market Value | G/L |
|---|---|---|---|---|---|---|---|---|
| IBM | 200 | 95.10000 | 108.4375 | 90.0000 | 3.30% | $3,697 | $21,687 | 2.38% |
| IBM GT | 10 | 1.05000 | 12.5000 | 0.2500 | 10.97% | $12,300 | $12,500 | 10.21% |
| KO | 100 | 60.10000 | 52.5625 | 50.0000 | 0.23% | $261 | $5,256 | -0.67% |
| MSFT | 35 | 115.10000 | 66.3125 | 60.0000 | 0.20% | $222 | $2,320 | -1.52% |
|  |  |  |  | Total = | 14.70% | $16,481 | $41,764 | 10.39% |

Bulls

| Stock | Shrs/Cont | Cost Basis | Last | Stop | %R/E | Risk | Market Value | G/L |
|---|---|---|---|---|---|---|---|---|
| FTSP | 500 | 8.65000 | 2.0625 | 10.0000 | 3.56% | $3,993 | $1,031 | 2.94% |
|  |  |  |  | Total = | 3.56% | $3,993 | $1,031 | 2.94% |

● Stk/Opt/MF    ○ Futures/Opt

Burst Update  
Edit Prices  
Size-It  
Trade-It  
Risk Report  
Protect-It  
Blotter  
Maintenance  
Print

*FIG. 13*

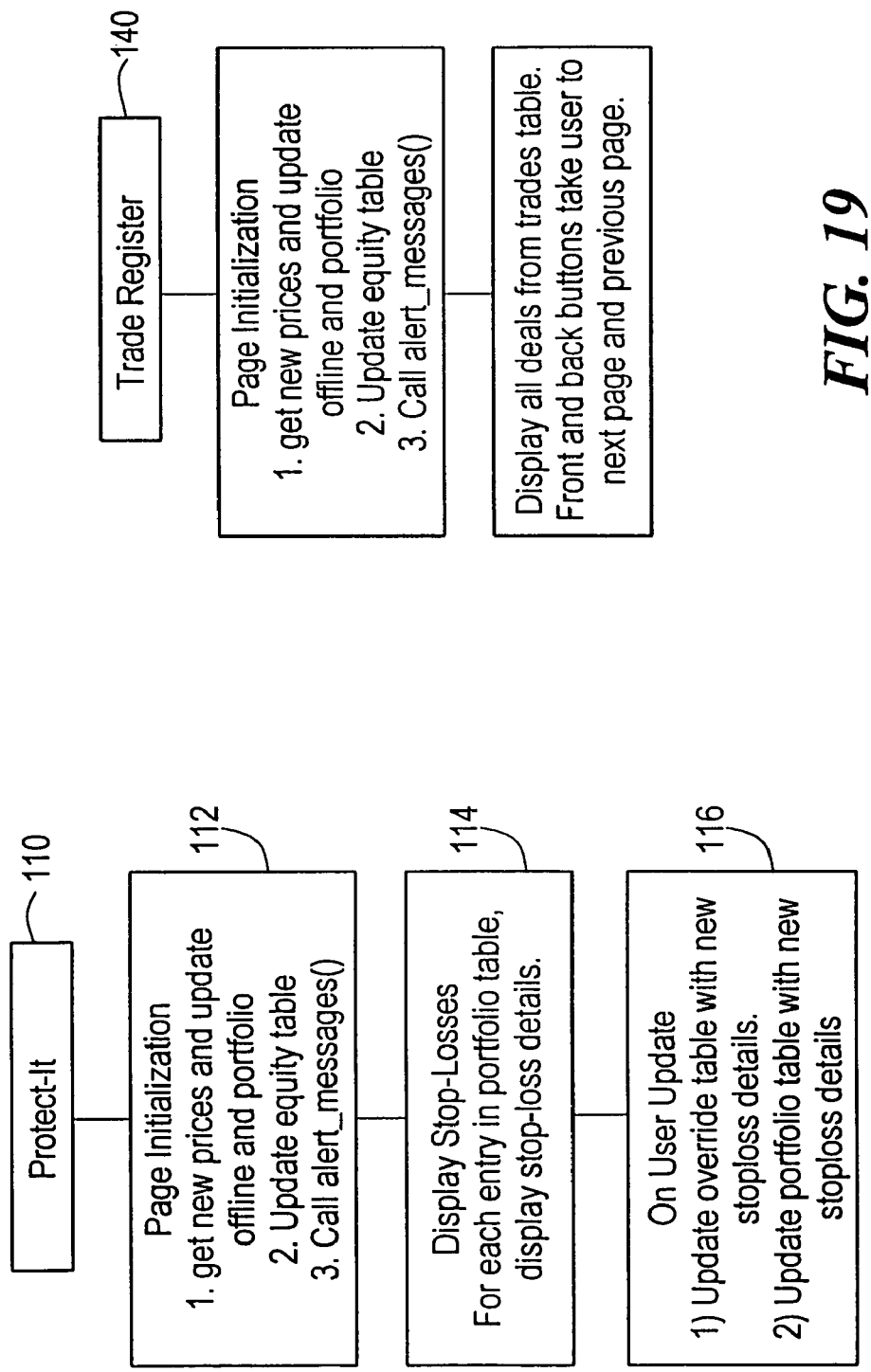

Stop Reporting - MoneyMaximizer Sample Trade

Protect-It™

To Adjust Stop, Broker or Session, on a portfolio position, double click on the stop. Return to your portfolio screen to split a lot. Items in red have expired stops.

| Action | Name | Symbol | Shares | Sell Stop | Buy Stop | Broker | Expdate |
|---|---|---|---|---|---|---|---|
| CVS STOP | First Team Sports Inc | FTSP | 500 | | 10.000000 | MENT | 01/01/99 |
| SEL STOP | IBM International Business | IBM | 200 | 90.000000 | | MENT | 01/01/99 |
| SEL STOP | G Jul - IBM International Bu | IBM GT | 10 | 0.250000 | | MENT | 01/01/99 |
| SEL STOP | Coca Cola Co | KO | 100 | 50.000000 | | MENT | 01/01/99 |
| SEL STOP | Microsoft Corp | MSFT | 35 | 60.000000 | | JC3 | 01/02/02 |

[Add Contingent Order]  [DeleteContingent]

| Action | Name | Symbol | Contracts | Sell Stop | Buy Stop | Broker | Session | Expdate |
|---|---|---|---|---|---|---|---|---|
| SEL STOP | Crude Oil Light Sweet | @CL.U | 1 | 16.000000 | | MENT | REG | 01/01/99 |
| SEL STOP | Cotton No. 2 | @CT.V | 5 | 72.850000 | | MENT | REG | 01/01/99 |
| SEL STOP | U.S. Dollar Index (FINEX) | @DX.U | 2 | 92.500000 | | MENT | REG | 01/01/99 |
| BUY STOP | U.S. Treasury Bond 30 Yr. | @US.U | 2 | | 115.000000 | MENT | REG | 01/01/99 |

Double Click on stop to change

[Add Contingent Order]  [DeleteContingent]  [Print Report]

*FIG. 15*

| | TOTAL | STOCKS/MF | FUTURES | OPTIONS |
|---|---|---|---|---|
| Equity-Risk: | $46,233.25 | | | |
| Planned Risk: | $8,726.75 | $4,996.75 | $3,730.00 | $0.00 |
| R/E%: | 15.88% | 9.09% | 6.79% | 0.00% |
| Equity | $54,960.00 | $54,725.00 | $235.00 | |

Est. Buying Power: $75,775.00

TRADE DATE BALANCE: $28,050.00
WITHDRAWABLE FUNDS: $1,000.00
ENDING BALANCE: $1,000.00

<< Off Line >>

| $ Trade Blotter - MoneyMaximizer Sample Trade | | | | | | | | | _ □ X |
|---|---|---|---|---|---|---|---|---|---|
| Trade Date: 08/21/97 ▼ | | << | | >> | Print | | Report Stks | | Port ? |

Stocks/Options/Mutual Funds

Buys

| Trans | Shrs/Cont | Symbol | Name | Size | Stop | Price | Comm | Secfee | Amount | Agycr | Broker |
|---|---|---|---|---|---|---|---|---|---|---|---|
| BUY | 200 | IBM | IBM International Business | 2.04% | 90.0000 | 95.0000 | 0.05000 | | $19,010.00 | | STOF |
| BUY | 100 | KO | Coca Cola Co | 1.02% | 55.0000 | 60.0000 | 0.05000 | | $6,005.00 | | STOF |
| BUY | 35 | MSFT | Microsoft Corp | 1.62% | 92.0000 | 115.0000 | 0.05000 | | $4,026.75 | | STOF |
| | | | | | | | | | | | |
| | | | | | | | | | | | |

Sells

| Trans | Shrs/Cont | Symbol | Name | Size | Stop | Price | Comm | Secfee | Amount | Agycr | Broker |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |

⊙ Stk/Opt/MF   ○ Futures/Opt

*FIG. 20*

```
* corecalc.prg
* Procedure to perform core calculations as needed
* when called, main proc will provide "receptacle" params to be passed back PARAMETERS mport, m_mkt, m_risk, mpwr, missue
* mport = Stock, Future, Option, All, Position
* m_mkt, m_risk = passback for mktval, risk, power
* missue = specific position to check (eg: IBM)

IF mport = "P"   && checking position
     missue = LEFT (missue+SPACE(10), 10)
ELSE
     missue = SPACE (10)
ENDIF mselect = SELECT( )
SELECT portfol
if eof ( )
      mProwHold = 0
else
      mProwHold = recno ( )
endif
m_smkt = 0
m_srisk = 0
m_fmkt = 0
m_frisk = 0
m_omkt = 0
m_orisk = 0
m_imkt = 0
m_irisk = 0
m_longs = 0
m_shorts = 0
GO TOP
```

*FIG. 22*

```
DO WHILE .NOT. EOF ()
  m_imatch = (stock = missue)  && .t. or .f. result
  **** These two vars are for individual issue values, rest are sums
  mlsVal = 0
  mlsDolrisk = 0
  DO CASE
    CASE sfo = 'S'          JUST STOCKS
      mlsVal = FxConv (shares*last_sale, stock)
      IF portfol->short
        m_smkt = m_smkt - mlsVal
        mlsDolrisk = FxConv(shares*ABS (stop-last_sale) + comm_in*shares, stock)
        m_shorts = m_shorts + mlsVal
      ELSE
        m_smkt = m_smkt + mlsVal
        mlsDolrisk = FxConv (shares*ABS (last_sale-stop) + comm_in*shares, stock)
        m_longs = m_longs + mlsVal
      ENDIF
      m_srisk = m_srisk + mlsDolrisk
      IF m_imatch
        m_imkt = m_imkt + mlsVal
        m_irisk = m_irisk + mlsDolrisk
      ENDIF
    CASE sfo = 'F'          JUST FUTURES
      IF portfol->short
        mlsVal = FxConv ( (buy_price-last_sale) *shares*gear,stock)
      ELSE
        mlsVal = FxConv ( (last_sale-buy_price) *shares*gear, stock)
      ENDIF
      m_fmkt = m_fmkt + mlsVal
      IF portfol->short
        mlsDolrisk = FxConv (shares*ABS (stop-last_sale)*gear+
                     (comm_in*shares, stock)
        m_frisk = m_frisk + mlsDolrisk
      ELSE
        mlsDolrisk = FxConv (shares*ABS (last_sale-stop) *gear +
                     (comm_in*shares) , stock)
        m_frisk = m_frisk + mlsDolrisk
      ENDIF
      IF m_imatch
        m_imkt = m_imkt + mlsVal
        m_irisk = m_irisk + mlsDolrisk
      ENDIF
    CASE sfo = 'O'          JUST OPTIONS
      mlsVal = FxConv (shares*last_sale*100, stock)
      IF portfol->short
        mlsDolrisk = FxConv (100*shares*ABS (stop-last_sale) + (comm_in*shares), stock)
        m_orisk = m_orisk - mlsDolrisk
        m_shorts - m_shorts + mlsVal
      ELSE
        m_omkt = m_omkt + mlsVal
        mlsDolrisk = FxConv (100*shares*ABS (last_sale-stop) + (comm_in*shares), stock)
        m_orisk = m_orisk + mlsDolrisk
        m_long = m_longs + mlsVal
      ENDIF
      IF m_imatch
        m_imkt = m_imkt + mlsVal
        m_irisk = m_irisk + mlsDolrisk
      ENDIF
  ENDCASE
  SKIP
ENDDO
```

*FIG. 23*

```
DO CASE
CASE mport = "A"            ALL/TOTAL EVERYTHING
     m_mkt = m_smkt = m_fmkt = m_omkt
     m_risk = m_srisk + m_frisk + m_orisk
CASE mport = "S"            JUST STOCKS
     m_mkt = m_smkt
     m_risk = m_srisk
CASE mport = "F"            JUST FUTURES
     m_mkt = m_fmkt
     m_risk = m_frisk
CASE mport = "O"            JUST OPTIONS
     m_mkt = m_omkt
     m_risk = m_orisk
CASE mport = "P"            JUST INDIVIDUAL POSITIONS
     m_mkt = m_imkt
     m_risk = m_irisk
ENDCASE mpwr = (2* (mtdbalance+mwdbalance+m_longs-m_shorts) ) - m_longs - m_shorts sele portfol
if mProwHold > 0
          goto (mProwHold)
endif
SELECT (mselect)

RETURN
```

PORTFOLIO ACCOUNTING AND RISK MANAGEMENT SYSTEM

CROSS REFERENCE TO RELATED APPLICATIONS

This application claims the benefit under 35 U.S.C. § 119(e) of U.S. Provisional Application No. 60/137,690, filed on Jun. 4, 1999, the disclosure of which is incorporated by reference herein.

STATEMENT REGARDING FEDERALLY SPONSORED RESEARCH OR DEVELOPMENT

N/A

BACKGROUND OF THE INVENTION

In securities trading, most coverage and advice for the common investor focuses on returns and profits. A fundamental strategy espoused by industry leaders revolves around selecting the best stocks that will provide returns over the long term. Managing risk is important, and a core tactic carried out within the industry. But, for the common investor, according to conventional wisdom, risk management is best handled by diversification and asset allocation. This is based on the maxim that business is cyclical and maintaining a portfolio of diverse investments in quality stocks minimizes risk. In any given cycle, there are high-fliers and as well as laggards. Diversity allows the investor to benefit from this and participate in the financial markets. Despite this, peak performance remains tied to one's ability to pick better securities and increase concentration of the portfolio's exposure to the winners while eliminating losers.

SUMMARY OF THE INVENTION

It remains, however, that no one can predict the future, and securities selection, deciding what and when to buy and sell, is only part of the investment process.

The present invention provides a better approach towards trading and investing for the self-directed investor by taking a more objective approach to managing risk. Rather than attempting to predict the future or gambling on a specific security, financial rewards are obtained by managing the amount of assets placed at risk in any given investment and for a portfolio as a whole. Using this approach, the investor will lose no more than is planned, while at the same time enjoy whatever gains may materialize.

The system also provides users not only with the ability to view risk at the level of an individual trade, but to also do the same within the context of bigger and more flexible portfolios, thereby providing users with a more real world-like situation for risk management.

Once a user has determined what security in which to invest, the user needs tools to help answer how much to buy or sell. This question can be reformulated as how much risk to which the user should be exposed. The present system provides a sizing module to address this question. This module addresses a number of parameters, such as type of security, current equity, current security price, and downside limit concentration.

DESCRIPTION OF THE DRAWINGS

The invention will be more fully understood from the following detailed description taken in conjunction with the accompanying drawings in which:

FIG. 9 is an exemplary display screen provided by the sizing module;

FIG. 11 is an exemplary display screen provided by the trading module;

FIG. 13 is an exemplary display screen provided by the tracking module;

FIG. 14 is a flow chart of a protection module of the present system;

FIG. 15 is an exemplary display screen provided by the protection module;

FIG. 16 is an exemplary display screen of a risk report;

FIG. 18 is an exemplary display screen of an option price calculator;

FIG. 19 is a flow chart of a trading register function of the present system;

FIG. 20 is an exemplary display screen of a trade register;

FIG. 22 is an exemplary code block for performing risk calculations;

FIG. 23 is a further exemplary code block for performing risk calculations;

FIG. 24 is a further exemplary code block for performing risk calculations;

FIG. 25 is an exemplary display screen of a portfolio selection function of the present system;

FIG. 26 is an exemplary display screen of a portfolio building function of the present system;

DETAILED DESCRIPTION OF THE INVENTION

Figure 1:
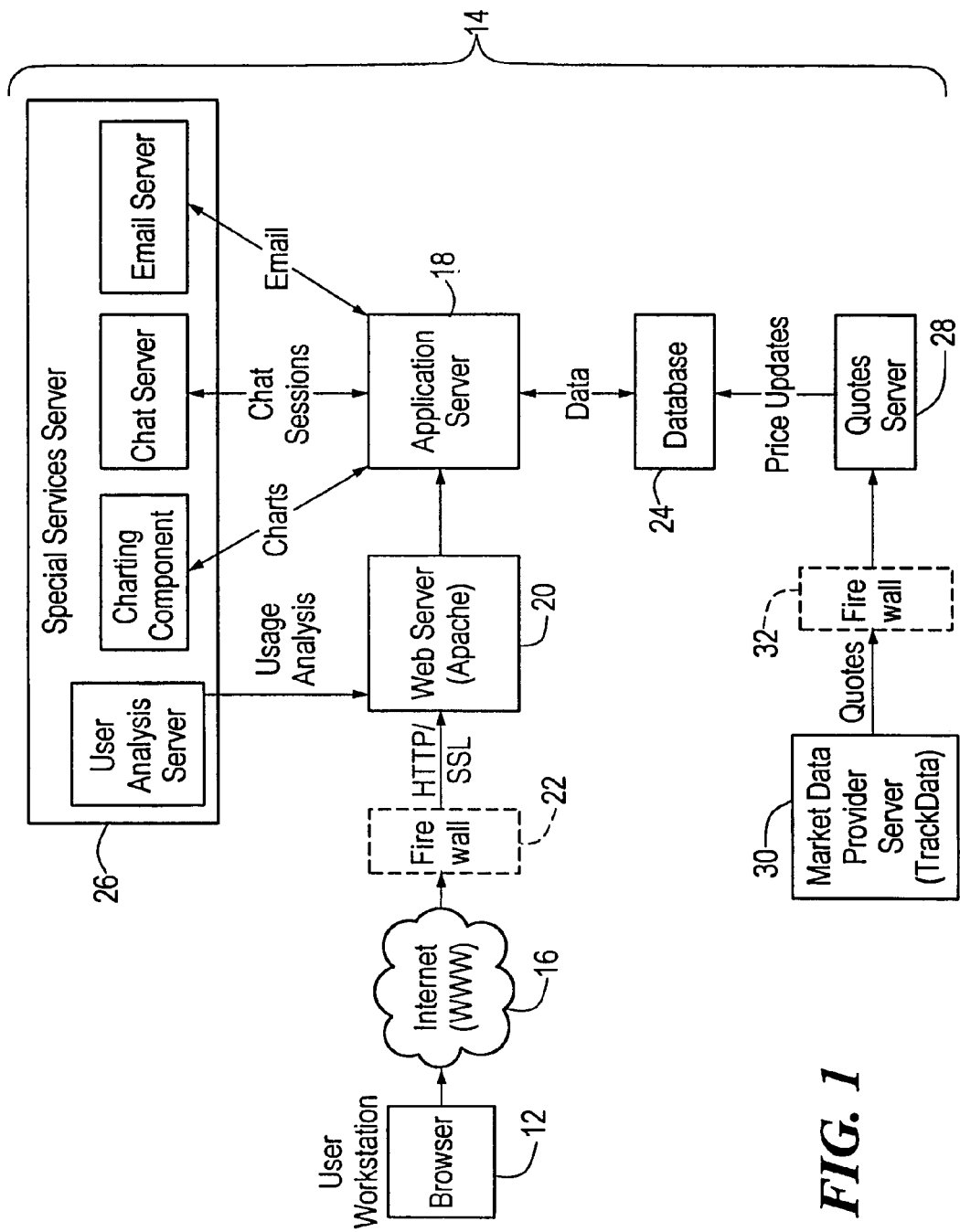
FIG. 1 is a block diagram showing a client computer system and a server computer system communicating over the World Wide Web ("Web") in accordance with an illustrative embodiment of the present invention.

Consistent with an illustrative embodiment of the present invention, FIG. 1 shows a client system 12 and an application server system 14 communicating over the World Wide Web 16 ("Web" or "WWW"). For purposes of illustration, the Web may be defined as those resources and users on the Internet using the Hypertext Transfer protocol (HTTP) to communicate information. Further for purposes of illustration, the client system and the application server system may, for example, consist of personal computers, work stations, Internet appliances, or any other type of hardware platform capable of executing computer software. Accordingly, each of the client system and application server system may include one or more processors, which are communicably coupled to a computer program storage device such as a computer memory, as well as one or more input/output devices. Further for purposes of illustration, the client system includes an Internet browser application program, operable to request data from the application server system responsive to actions preformed by a user of the client system.

The application server system 14 includes an application server 18 that functions as a node on which all business services run. Business services are objects that service the graphical user interface of the present system, described further below. A web server 20 is provided for managing web-based client access to the system. Because data transmitted between the client system and the application server system is often sensitive or confidential, a firewall 22 outside the web server using an authentication and encryption mechanism, such as Secure Socket Layer (SSL), is provided. A database 24 in communication with the application server is provided for storing data, discussed further below. External facilities, such as chat, charting, e-mail, obtaining price quotes, and usage analysis services may be provided on a special services server 26. A quotes server 28, also referred to herein as a market data server or data feed server, is provided in communication with the database for obtaining price quotes from an external market data provider 30. A firewall 32 is provided outside the quotes server for security.

Figure 2:
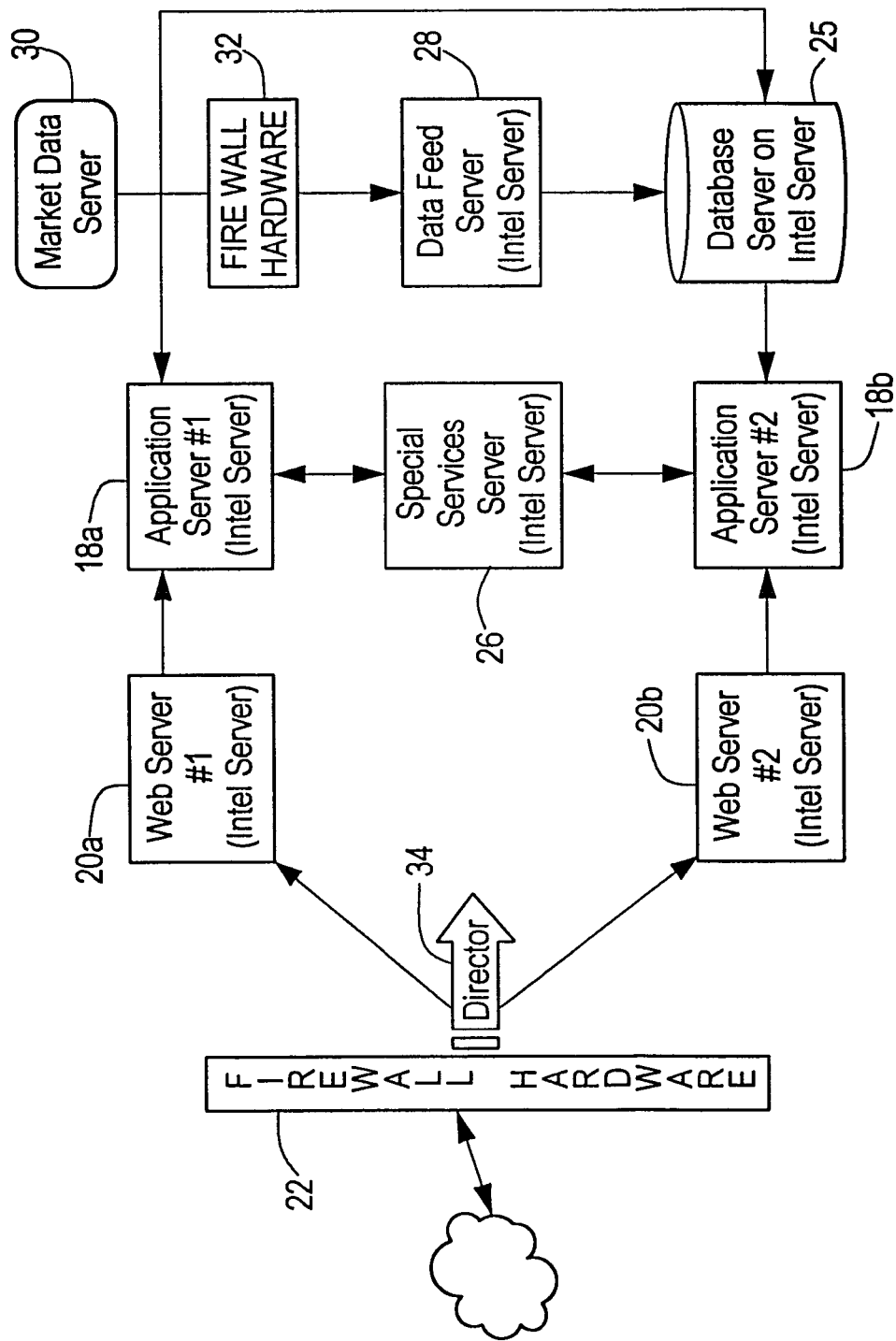
FIG. 2 is a block diagram showing a physical deployment as a web farm.

FIG. 2 illustrates a preferred embodiment of the hardware deployment of the invention in a web farm implementation. It will be appreciated that more than one of each server (two are shown) may be provided to handle, for example, high volume activity. A director 34 is providing for load balancing of the web servers. Each web server machine 20a, 20b is connected to an application server machine 18a, 18b. The application server machines are each connected to a separate special services server machine 26 that hosts the specialized services. The application server machines are also each connected to a database server machine 25. Connection to external service providers, such as an external market data server 30, is provided in a suitably secure manner, such as through a special T1 link or frame relay, possibly using an extranet or virtual private network and data feed server 28.

Any web server can be used for hosting a user-interface site for the system. The Apache web server is a robust server that performs well and is generally suitable. Other alternatives include Windows NT as the operating system and/or Microsoft IIS as the web server. The application server should provide pre-built frameworks and components that can be reused. In-built support for standards based Enterprise Java Beans and performance of processing the business logic is preferred. Also, dynamic replication and proper sharing of the load from simultaneous users hitting the site are desirable. Application servers from BEASYS, such as Weblogic, and UNIFY, such as e-Wave, are typically used in e-commerce and e-business spaces and are suitable. Any suitable web server and application hardware can be used. Preferably, a dual processor Pentium III with at least 512 MB of RAM and preferably 1 GB of RAM is used. The database used by the system is not critical. DB2 from IBM and Oracle 8I from Oracle are suitable. Others include Informix and SQL server.

The database server may reside separately from the web server and the application server.

The system can be implemented in any programming language, and any operating system can be used as the platform for development of the user-interface site. Typically, financial institutions employ Java or CGI on Unix-variant platforms, such as Linux, Sun Solaris, or IBM AIX. Java is particularly suitable as it performs substantially independently of the operating system.

Figure 3:
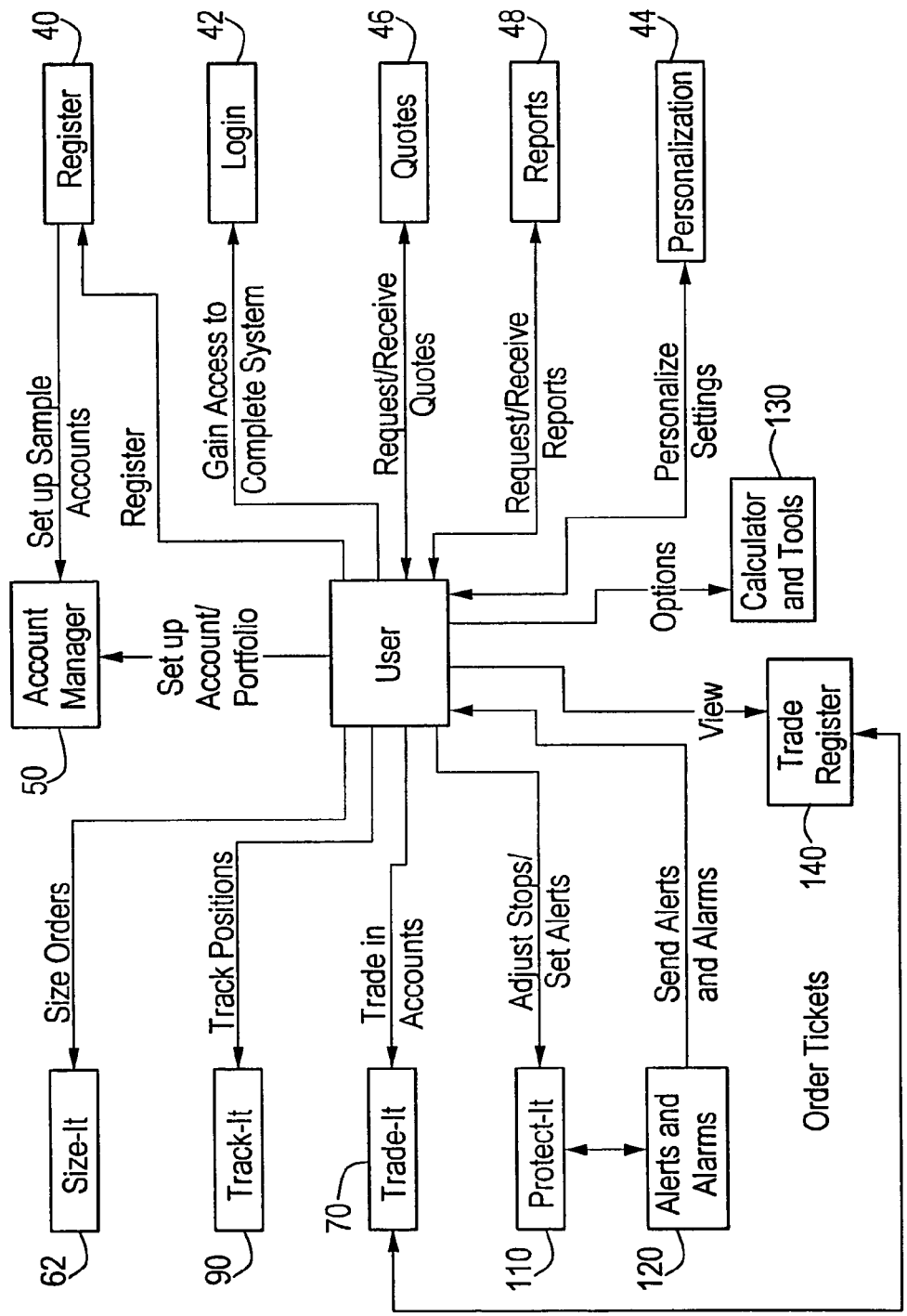
FIG. 3 is a block diagram showing logic modules.
Figure 4:
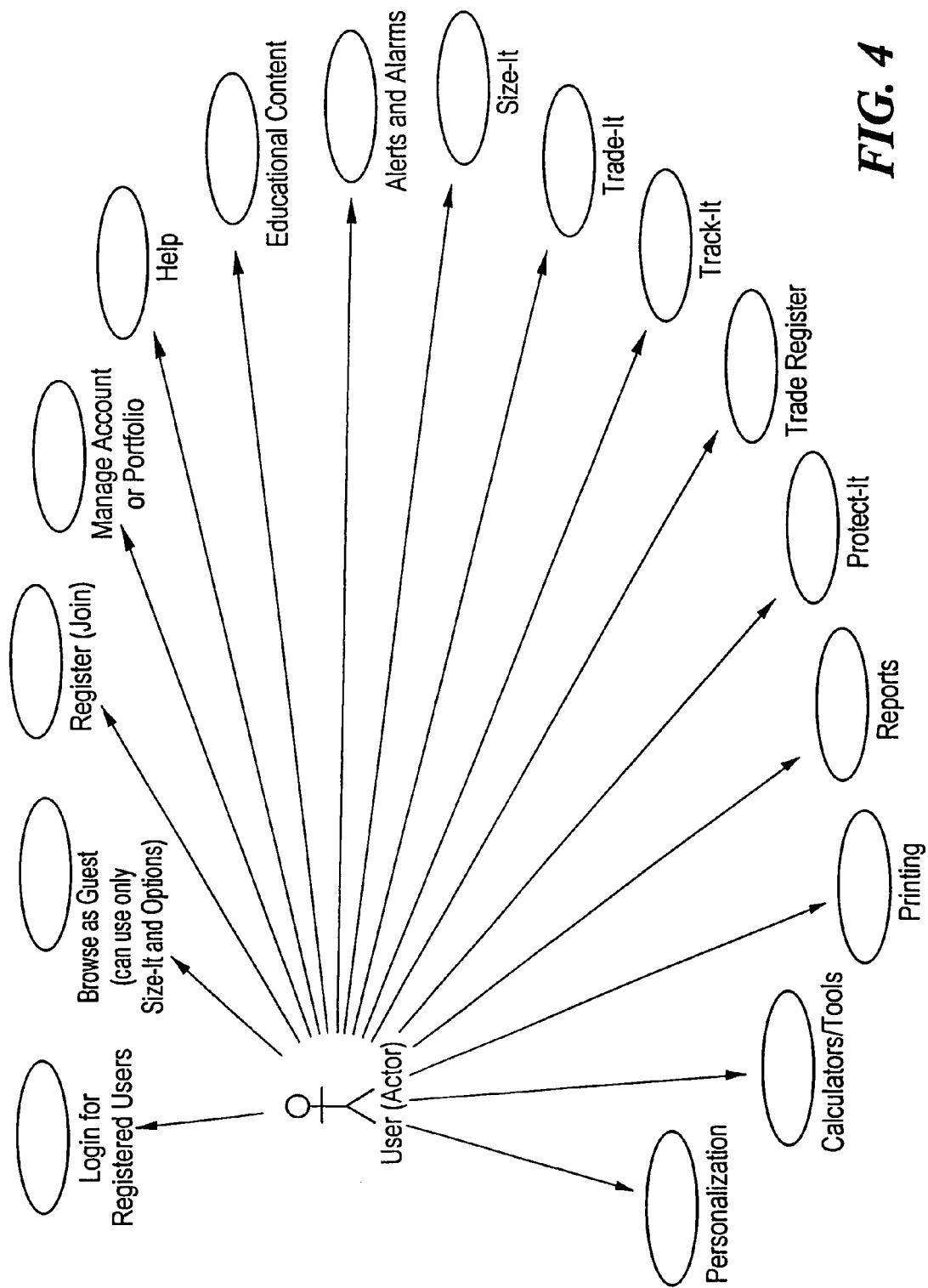
FIG. 4 is a diagrammatic representation showing services provided by the present system from a user's level.

Referring more specifically to FIG. 3, the application program provides a number of logic modules or packages that, in the preferred web-based implementation, reside on the application server and are accessible by the user residing at the client computer system. It will be appreciated that the various modules are capable of interacting with each other, although for clarity this interaction is not indicated on FIG. 3. The content of the logic modules is discussed further below. From the user's perspective, the user is provided with a variety of services (FIG. 4) that correspond generally to the logic modules.

Figure 5:
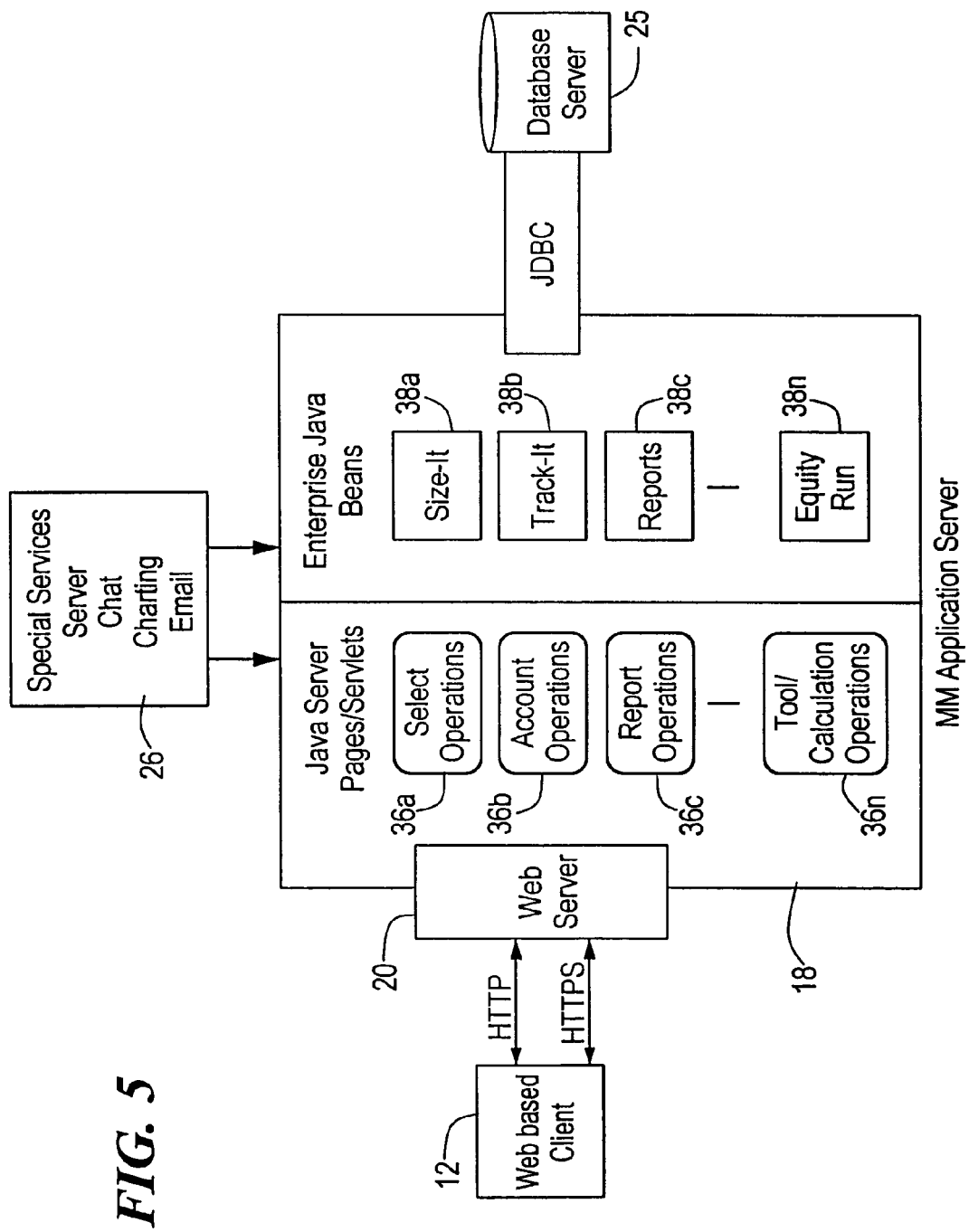
FIG. 5 is a block diagram showing a logical deployment of the present system.

FIG. 5 illustrates a preferred embodiment of a logical deployment of the system architecture using the J2EE architectural standard. The client 12 accesses the system through the web server 20. The web server redirects the client's requests to appropriate servlets/Java Server Pages 36a, 36b, 36c, . . . 36n, in the application server 18. The servlets/JSPs process the request and fetch required data if needed from the data base server 25 with the help of Enterprise Java bean objects 38a, 38b, 38c, . . . , 38n. The results of the request retrace the request path. It will be appreciated that other architectures may be provided.

Referring again to FIG. 3, a new user initially registers, using a register module 40. Within this module, the system collects a user ID, password (with "confirm password" input), and email address from the user. The user chooses a user ID, and the system checks for uniqueness of the user ID and presents alternatives in case of ambiguities. The email address is used for communications, such as password reminders, alerts, alarms, and messages, responses to queries, and regular service updates. A login module 42 is used for subsequent logins so that the user may gain access to the complete system. The login module provides the user with the option to save the user ID and password for auto login purposes. The option of allowing a non-registered user limited access to browse as a guest may also be provided.

In a personalization module 44, the user may optionally specify preferences for ease of use. These preferences may include the currency in which the user sees his overall positions, the country of major holdings, the user's sophistication level, typically either average or high, a help language, and a preferred risk-bearing capacity. The system provides defaults, such as to the US dollar for the currency, the United States as the country of major holdings, and English as the help language. In the presently preferred embodiment, the preferred risk-bearing capacity may range from 0.25% to 5.00%, with a default value of 2.5%. It will be appreciated that other ranges and defaults may be provided. The user also may request to receive price quotes through a quotes module 46 and may request to receive various forms of reports through a reports module 48.

Figure 6:
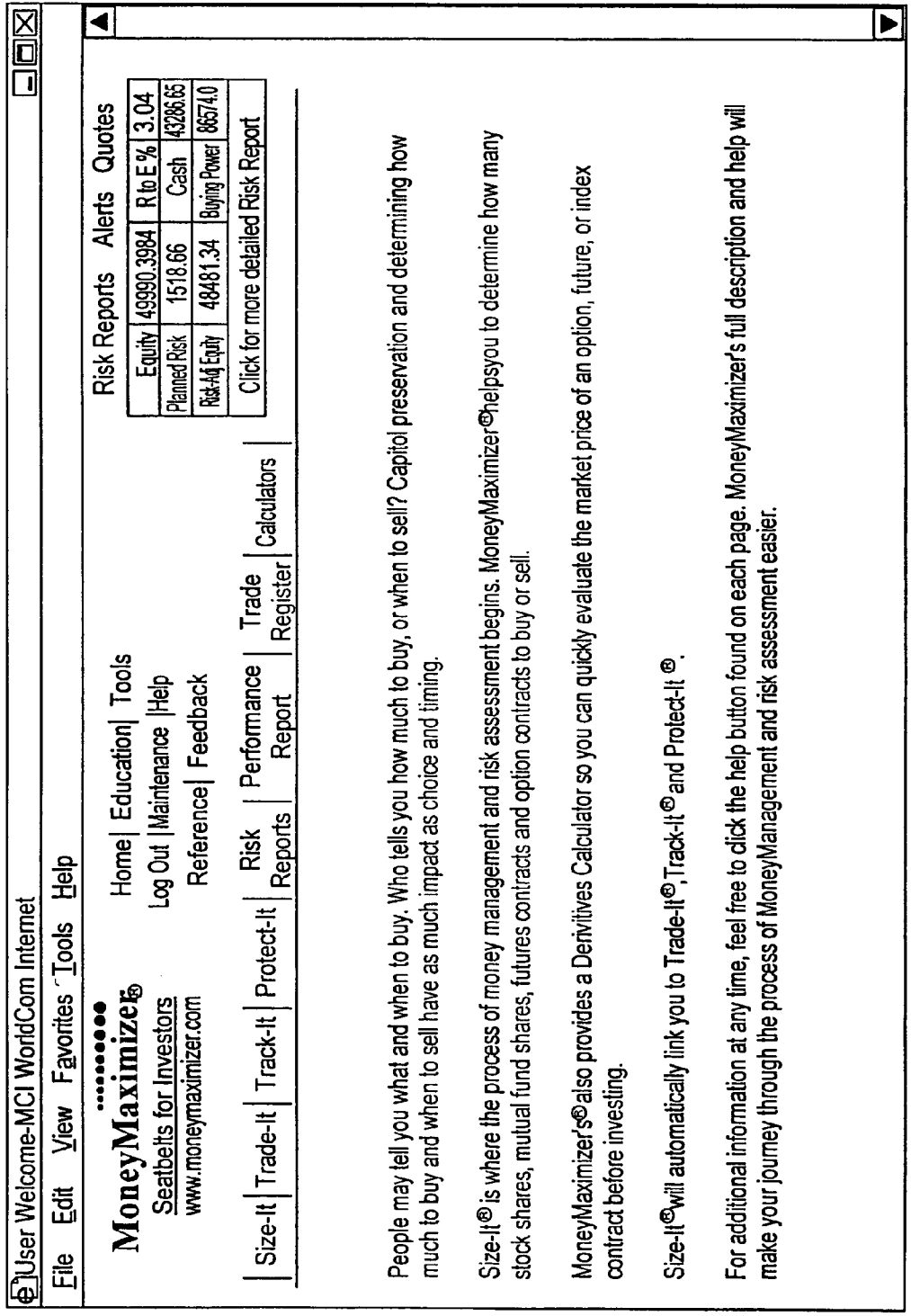
FIG. 6 is an exemplary main display screen of the present system.

An account manager module 50 is provided for managing the portfolios and accounts of the clients. As used herein, an account is defined as a collection of securities and a portfolio is defined as a combination of two or more accounts. Portfolios do not directly hold cash or other securities. After a user logs in, the account manager module provides a main screen (FIG. 6) with various options for the user. The presently preferred options are listed as "Size-It," "Trade-It," "Track-It, "Protect-It," "Risk Report," "Performance Report," "Trade Register," "Calculators," and "Maintenance." These options are discussed further below.

Within the account manager module, a user is able to add new accounts and delete existing accounts. The user may maintain multiple accounts and/or multiple portfolios. The user may add funds to an account and transfer funds between accounts. The user may transfer instruments between accounts of similar type. The user may select one account or one portfolio as the default for all subsequent operations. The default account and portfolio may be changed at any time. The user may update all accounts and receive alerts on all securities for all accounts at all times. All the currencies for the account or portfolio are displayed in the currency of the account or portfolio, except for stock currencies, which are displayed in the currency of the stock.

To set up an account, the user provides a text string for identification purposes and a text string that better describes what the account is about. The user then selects the type of account, such as stocks/mutual funds, stock options, futures, futures options, or another type, such as bonds. The system selects the base currency, as the default currency previously selected. The system requests the name of the broker being used for the account. The user next inputs current funds available (debit if on margin) in the account. The system requests validation of whether the account is a sample account or a user-defined account. The system also requests whether this account should be the default account for subsequent operations. The user may select up to three indexes, such as the Standard & Poor's 500 Index, against which account performance can be compared. Finally, the user inputs the margin the user has on the account. For example, a value of 50 indicates a 50% margin account. A value of 0 indicates a cash account.

Figure 7:
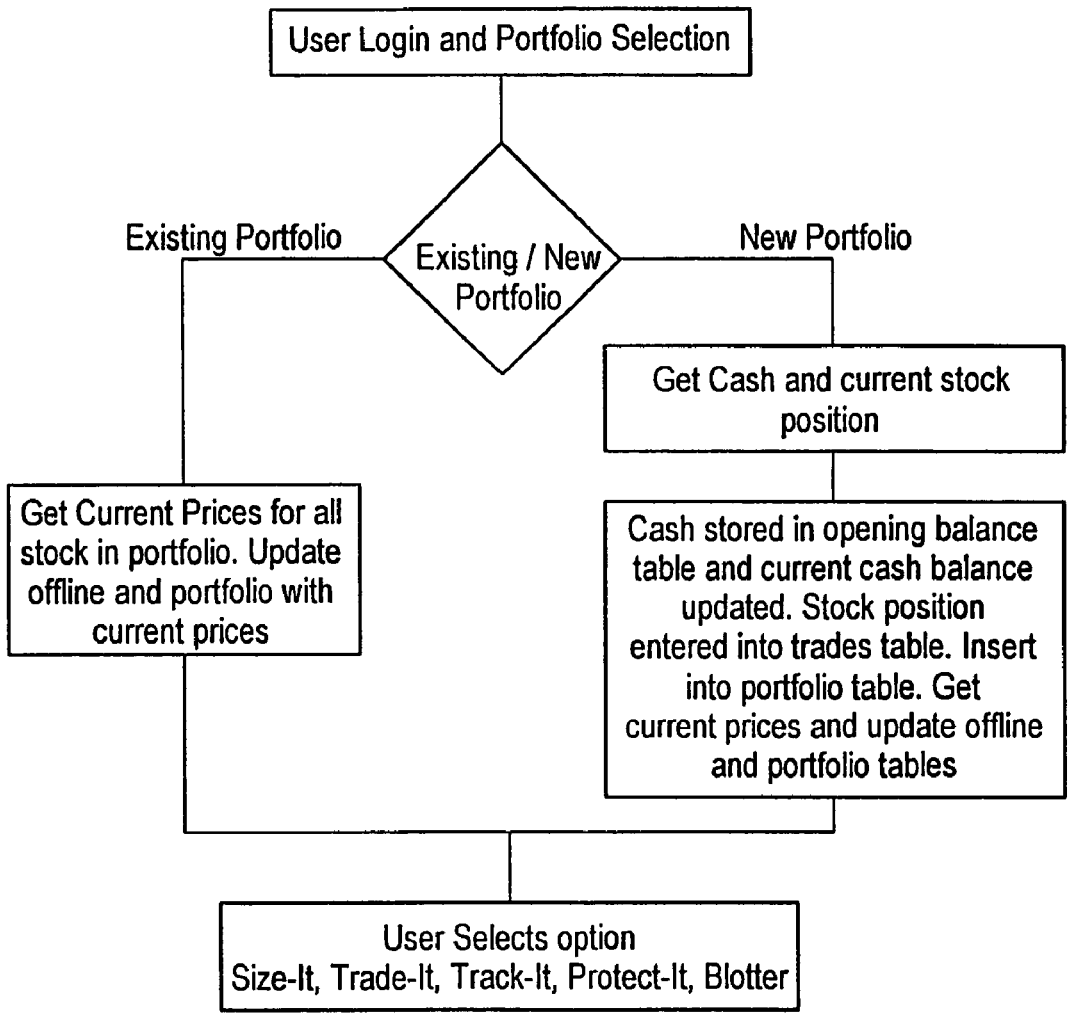
FIG. 7 is a flow chart of initial steps in the present system.
Figures 18, 25:
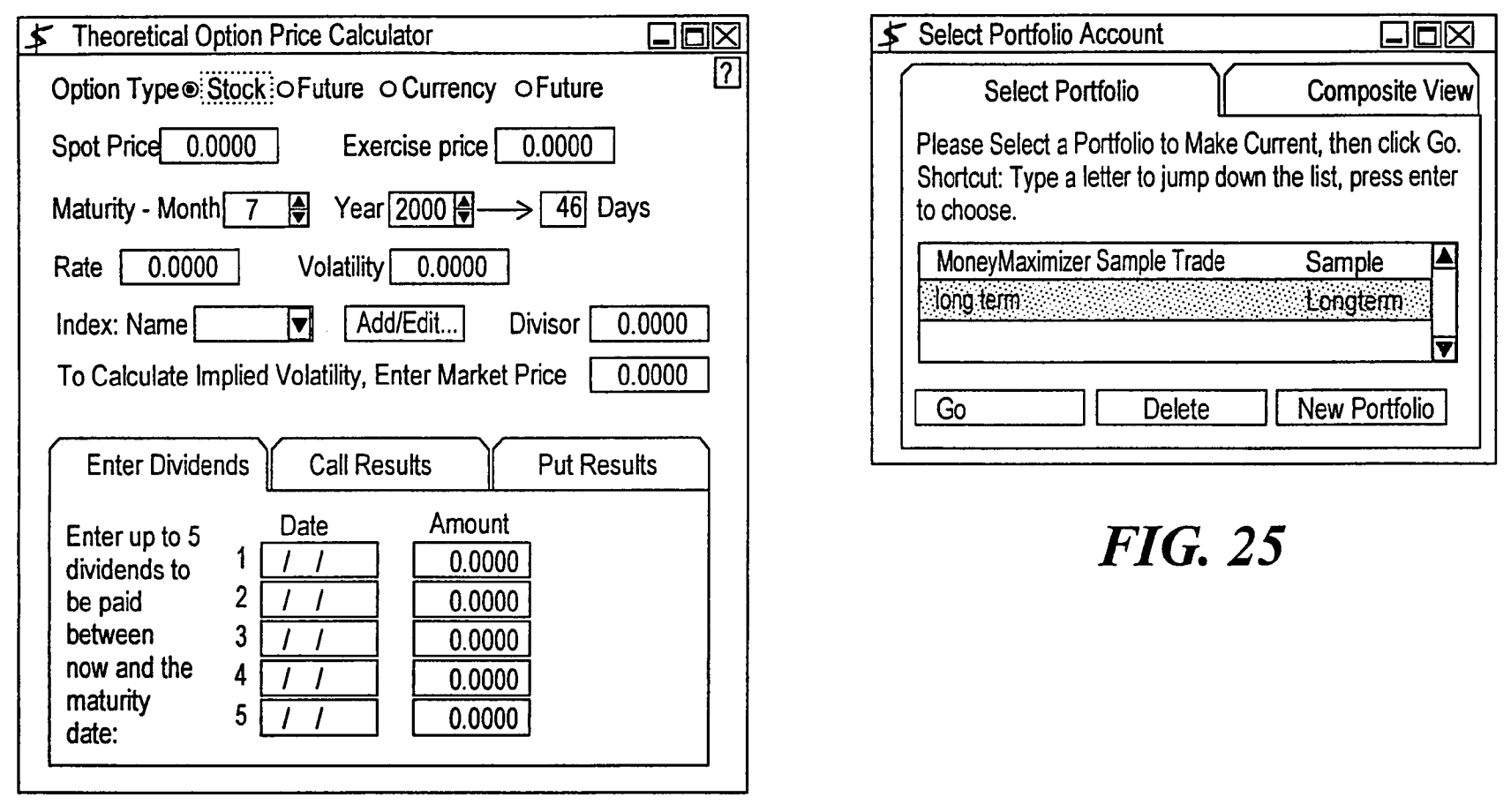
Figure 26:
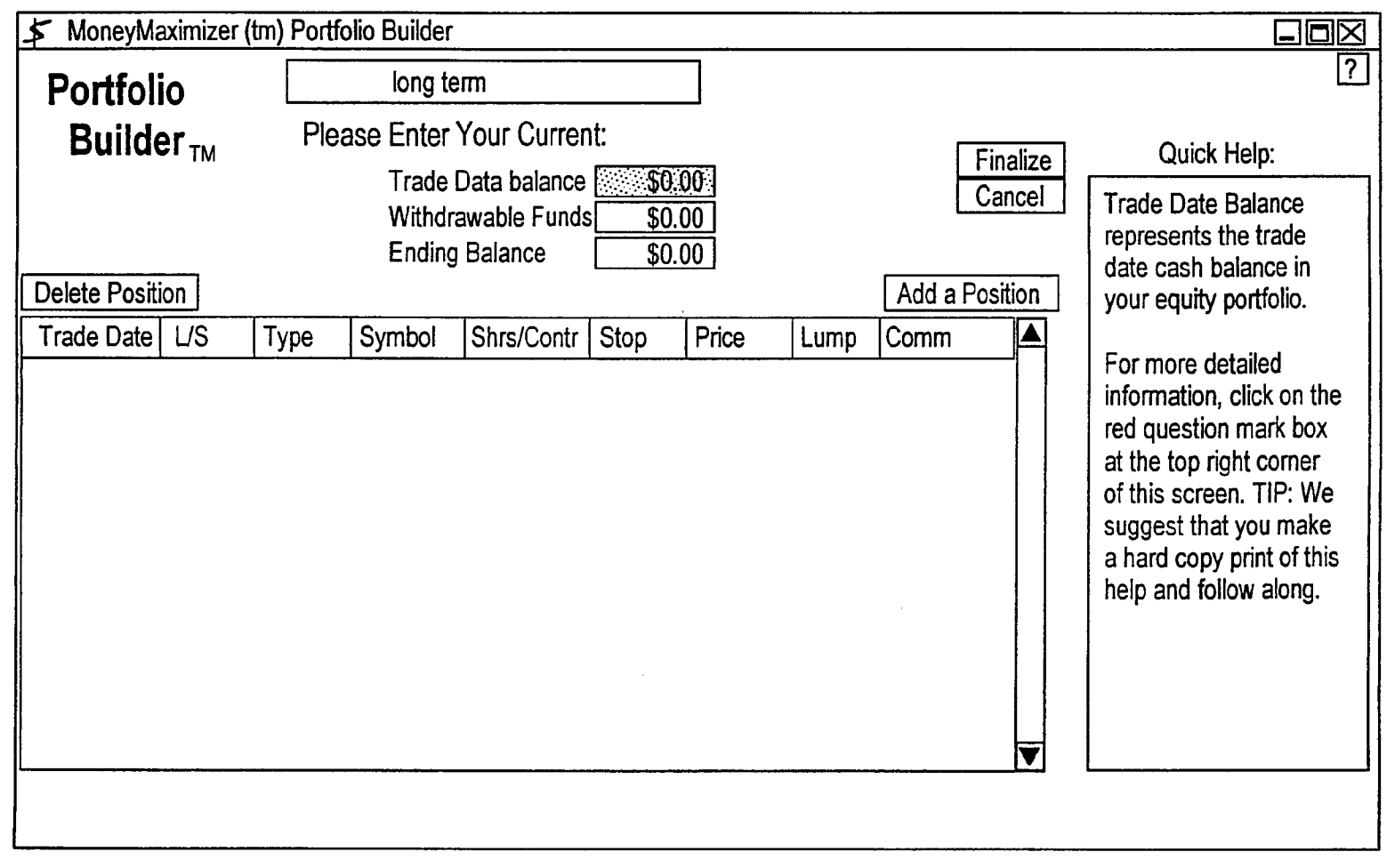

To set up a portfolio, the user inputs a text string for identification purposes and a text string that better describes what the portfolio is about. The system selects the base currency as the default currency previously selected. The system also requests whether this account should be the default account for subsequent operations. The user may select up to three indexes, such as the Standard & Poor's 500 Index or the Russell 2000 Index, against which account performance can be compared. Referring to FIG. 7, the system is also able to update prices in the portfolio. FIGS. 25 and 26 illustrate exemplary display screens for setting up and maintaining accounts and portfolios.

Once a user has determined what security in which to invest, the user chooses a sizing module 52, denominated "Size-It" herein for identification purposes. The sizing module provides the user with the tools to help answer how much of a particular security to buy or sell. This question can be reformulated as how much risk to which the user should be exposed.

Order sizing can be performed for equities, futures, or other types of instruments. User defined symbols (private symbols, for example, for instruments such as bonds) may also be sized with appropriate user inputs. It is not necessary for the user to select an account or portfolio for an order to be sized. However, more relevant results are obtained when the order is sized in relation to an existing account or portfolio. If the user selects an account, all calculations happen after converting the instrument's currency to the user's account currency. If the user has not selected an account, all calculations happen after converting the instrument's currency to the user's base currency.

The system may present average and sophisticated investors with differing complexities of user interface. A simpler user interface has fewer mandatory input fields and displays results in a simpler format. The system also provides the user with the ability to shift between the two interfaces.

Figure 8:
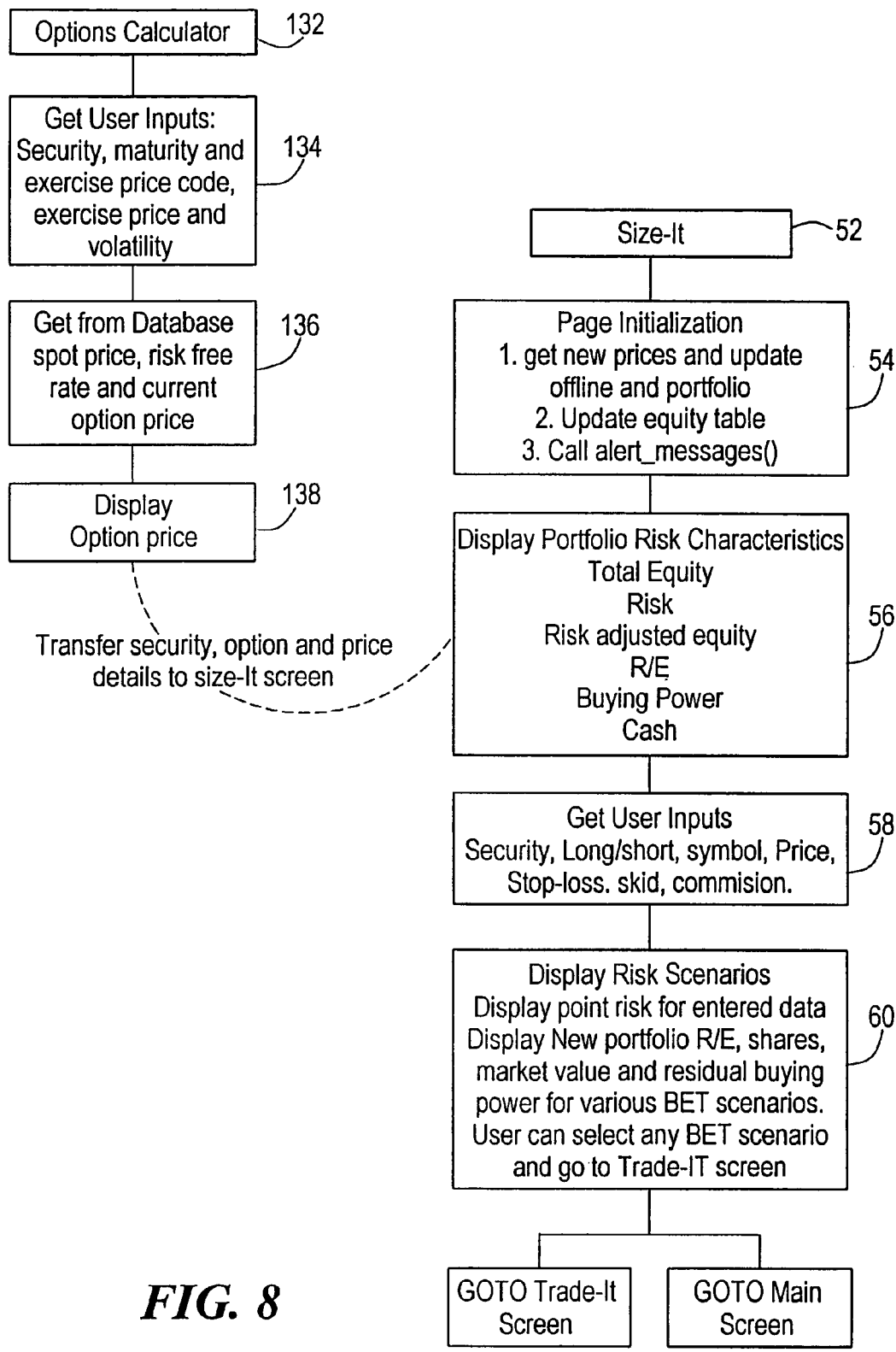
FIG. 8 is a flow chart of a sizing module of the present system.

Referring to FIG. 8, upon initialization, step 54, of the sizing module, the system updates prices and the user's equity. The system requires a user's equity at hand for calculating the buying power and for sizing different risk scenarios. For stock sizing, the equity is in the currency of the stock, and therefore this becomes currency (Fx) independent. For futures, the instrument's sizing is dependent on the currency per tick, and therefore is currency dependent. For registered users, the equity is picked up from the account or portfolio on which sizing is being performed. The system displays certain portfolio risk characteristics, step 56, discussed further below.

The user enters certain data and information, step 58, before the system can calculate a risk scenario. Preferably, the user enters the required data and information into input fields in a window such as that shown in FIG. 9. The user enters the type of security, stock/mutual fund (MF), future, option, or another desired type. Also, the user selects one of long or short for stock or mutual fund shares or option contracts and buy (long) or sell (short) for futures contracts. Access to a symbol look-up table is provided in which the user may find a particular stock, mutual fund, stock option, futures, or futures option. The user may also input the symbol directly. Once a symbol is selected, the system automatically fills in the name corresponding to that symbol. The current market price of the security is automatically retrieved. The currency is in the currency of the country where the symbol is listed. In case of other types of instruments, the user enters the price manually only if the price for that symbol has not been entered in a private list.

The user enters a selected stop-loss price. The stop-loss price, also referred to as the stop price or stop, is the price at which a user sells a losing position. A stop-loss price or point may be figured in several ways, such as volatility, chart points, percent retracement in price, and moving averages. For example, if the user is comfortable seeing a stock go down by only 20% from its current price, the user enters the price at this level. This sets the user's stop and provides for a measurement of risk, discussed further below. If no stop price is entered, the default stop price is 25% of the current market price. Another default stop price could, of course, be set. The currency of the price is in the currency of the country where the symbol is listed.

The user also enters the skid or slippage amount that is anticipated in the transaction once the order is executed. If no skid is entered, the default skid is 5% of the current market price. Another default skid could, of course, be set. The currency of the price is in the currency of the country where the symbol is listed. The more liquid and the smaller the order is, relative to the securities trading volume, the less is the skid that can be expected. Also, the less obvious the stop price chosen, relative to the securities chart pattern and/or the less volatile the market, the less the skid that can be expected. Skid may also be affected, for example, by news reports, earnings and crop reports, obvious support and resistance chart points, and catastrophic events.

The user enters the commission per share or contract to be paid to the broker/dealer or futures commodity merchant for the transaction. This amount should be inclusive of all exchange handling fees and government taxes and fees. For example, if the commission is $50.00 for 1,000 shares of stock, the user enters 0.05 cents a share. For futures and options, the broker/dealer or futures commodity merchant can provide an inclusive per-contract amount.

When trading options, the user selects the codes for put or call and for the expiry month, or the user directly enters the symbol with the codes manually. The symbol remains the same until expiration or exercise of the option. For a futures contract, the user selects the month code or directly enters the symbol with the codes manually.

Futures gearing is shown to the user if the futures symbol is listed within the system. It is defaulted to the product of Fx/tic and tics per point for that future. The currency shown is in the currency of the future. If the future is not listed within the system, the user is prompted to enter the Fx/tic, the tics/point, the spec margin, and the customer margin (defaulted to the spec margin value unless the user inputs a different one) for that future.

The user also enters the estimated buying power. The user should consult with the broker/dealer and futures commodity merchant to accurately determine the buying power for the stock account and the withdrawable funds and margin requirement for the futures account. The user also enters the amount of cash available for the purchase of securities.

As discussed above in accordance with step 56, the system provides the user with an overview risk of the entire portfolio. The system uses the following macro-risk assumption formula, which is determined for each instrument:

$$\text{planned risk} = (MP - SL + C + SKID) \times NS,$$

where
MP=market price,
SL=stop-loss price,
C=commission in and out,
SKID=skid, and
NS=number of shares or contracts.

The system determines the user's total equity minus the sum of the planned risks for each instrument in the entire portfolio. This value is displayed for the user, for example, in the "Equity-Planned Risk" field in FIG. 9. The system also determines the user's risk/equity percentage, which is the sum of the planned risks for each instrument in the entire portfolio divided by the equity of the portfolio. This value is displayed as a percentage to the user, for example, in the "R/E" field in FIG. 9. The system also determines the user's risk to an existing position in the security under consideration, which is the sum of the existing risk related to the security in the portfolio divided by the equity of the entire portfolio. If the user does not presently own the security under consideration, this value is 0. This value is displayed to the user, for example, in the "Risk to Position" field in FIG. 9. The system also displays for the user the current buying power and available cash.

After the user enters the required data for the security under consideration, the system determines several risk characteristics and several risk scenarios, step 60, which are displayed for the user in a screen, FIG. 9. The system determines the point risk, which is the planned risk per share. The point risk is the difference between the price and the stop in the currency of the stock plus the skid plus commissions (long or buy):

$$\text{point risk} = MP - SL + C + SKID.$$

For short sales, the formula is the converse:

$$\text{point risk} = MP + SL - C - SKID.$$

Referring to FIG. 9, various risk scenarios are displayed in a montage within the window. The scenarios are calculated for various increments of risk within the specified range of risk bearing capacity selected by the user. As noted above, the default range is 0.25% to 5.00%. The scenarios are determined for risk increments of, for example, 0.25%, which are displayed under the column headed "Size % Risk." The risk increments may be variable. The size % risk range and incremental value(s) may be selected by the user. For each size % risk, a number of shares corresponding to that size % risk is calculated by multiplying the size % risk by the value of equity minus planned risk divided by the point risk. These values are displayed under the column headed "Shares." For example, for a size risk of 5.00%, a point risk of 19.681 and a value of equity minus planned risk of $61,970.05, the number of shares to purchase is 157.

The new risk/equity is the sum of the risk of the entire portfolio plus the amount of additional risk, the size % risk (for example, 5.00%) that would be added by the transaction, for example, by purchasing the security under consideration. The size % risk is the percent of the total portfolio that would be at risk after the transaction for the given point risk. For example, for a portfolio with an existing risk/equity of 1.43%, a purchase having a size risk of 5.00% increases the risk/equity to 6.43%.

In the montage, the system displays for the user the number of shares (or contracts) corresponding to a given size risk. The system also displays the market value of the transaction, which is the number of shares multiplied by the security price. For futures and options, the system includes an additional gearing mechanism (not shown). The system also determines the buying power that the user will have after the transaction occurs, which is the cost of the transaction subtracted from the existing buying power.

FIGS. 22-24 illustrate an example of code suitable for performing the above risk calculations. FIG. 22 shows a code block that contains the core risk calculations used in the present system. This functionality may be called differently by different parts of the system depending on the context (totaling everything, totaling just stocks, futures, options, or just looking at a single position). FIG. 23 shows a code block that churns through the database evaluating all entries of the conditional type. FIG. 24 shows a code block that computes total market value and total risk of all the conditional elements, building on what was tallied in the code block of FIG. 23.

Figure 10:
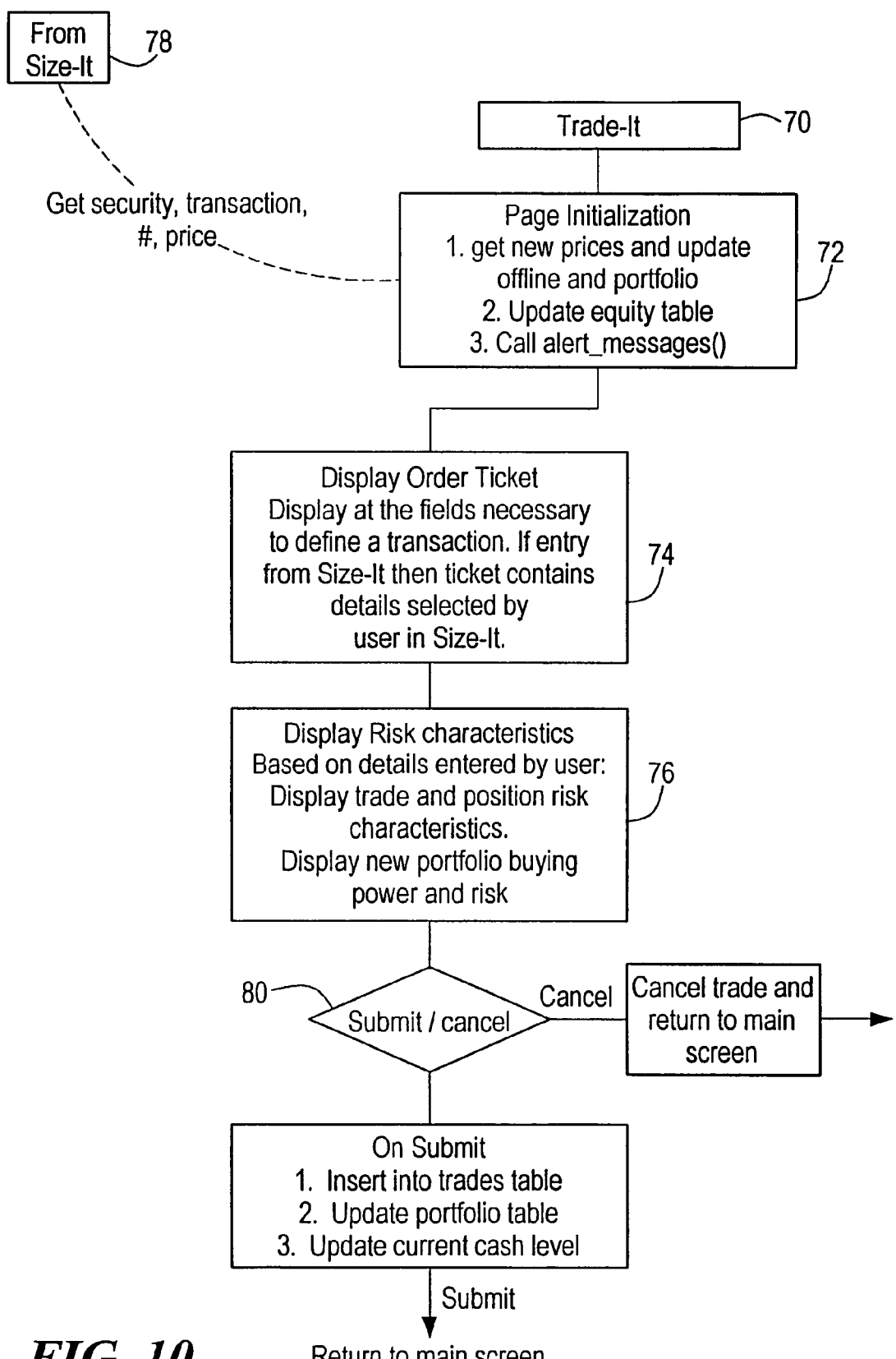
FIG. 10 is a flow chart of a trading module of the present system.

Given the various risk scenarios displayed by the sizing module, the user may decide whether to buy or sell the security and, if so, how much of that security to buy or sell. If the user decides to buy or sell the security, the user selects the trading module 70, denominated "Trade-It" herein. See FIG. 10. The user can access the trading module from the main screen or from the sizing module screen. The trading module updates any information in an initialization step 72.

The trading module provides a screen (FIG. 11) in which the user enters or updates the necessary information, step 74. The information includes the trade date, the type of security (stock/mutual fund, future, or option), the transaction type (buy, sell, sell short, buy to cover), the symbol, the month and strike price for futures and options, the number of shares or contracts, the price of the transaction, the stop-loss price, the alert limit price, the stop expiration date, and the broker used, the commission paid per share or contract.

The trading screen also provides the user with a summary of the existing portfolio, step 76. The system is able to display the existing portfolio positions and stops and the planned risk to equity represented by the contemplated transaction for this trade and for the entire position. The system also displays the current estimated buying power and the estimated buying power after the contemplated transaction. The system also displays the current planned portfolio risk. If the trading screen is accessed directly from the screen for sizing an order, step 78, the input fields in the trading screen default to the scenario selected in the sizing screen.

Upon entry of the user's information, the system generates an "order ticket." The user must contact his/her broker/dealer to execute the trade. The user should then record the trade upon receipt of the trade confirmation from the broker. The order ticket lists the settlement date, which is generally the trade date plus three days for stocks, and the trade date plus one day for futures and options, accounting for holidays. The system also determines the actual expense for the transaction. The system allows the user to submit the order ticket for recording after the appropriate information has been entered, or to cancel the transaction before submitting an order ticket, step 80.

Figures 12, 17A:
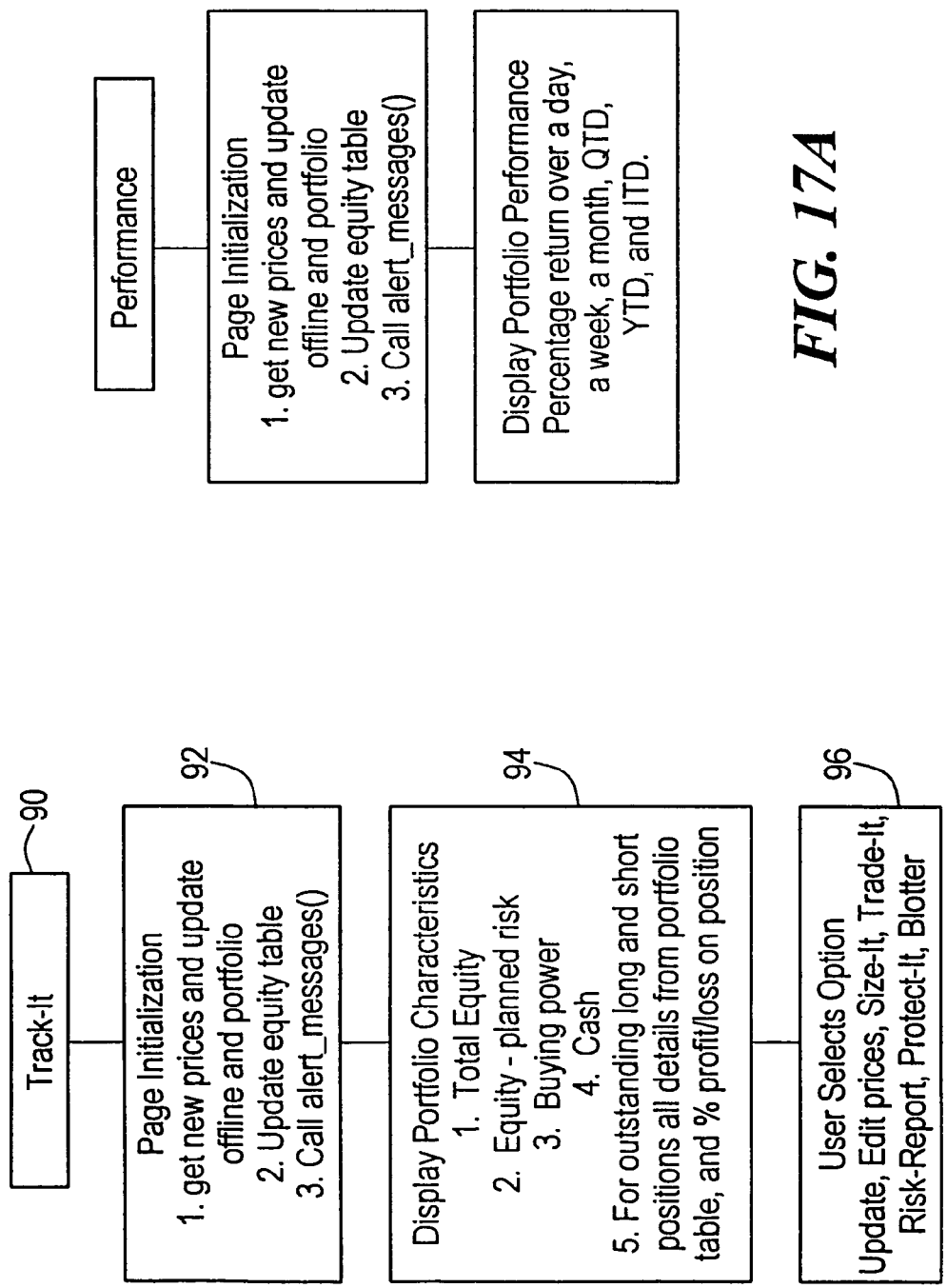
FIG. 12 is a flow chart of a tracking module of the present system.
FIG. 17A is a flow chart of a performance reporting function of the present system.

The system also includes a tracking module 90, denominated "Track-It" herein, that provides the user with the ability to track the user's portfolio. See FIG. 12. Upon initialization, step 92, the tracking module updates price and equity information. The tracking module provides a screen (FIG. 13) that summarizes the status of the user's portfolio. In step 94, this screen displays the total equity, equity minus planned risk for the portfolio, the user's estimated buying power, and the user's available cash. The user is able to select various options after viewing the tracking module information, step 96.

The tracking screen also provides a chart or grid listing each security owned. For each security, the system lists the symbol, the number of shares or contracts, the cost basis (for example, by averaging all lots on a first in, first out basis, accounting for in and out commissions), the last price for the security, the stop price entered on the order ticket or after subsequent adjustment, the planned risk for the position divided by the portfolio's total equity, the total dollar risk of the position factoring in the planned stop and the last sale of the security, the market value (amount of shares multiplied by the last sale price), and the weighted percentage gain or loss that the position maintains. The gain or loss may be shown in percentage and in absolute dollar terms.

All securities with the same symbol, the same stop, and belonging to the same account are aggregated to show a single record. The cost basis shown is the sum of the aggregated lots. If the user is viewing positions in an account, the user may adjust stops and alarms and alerts on various positions. For a particular lot (aggregated or not), the user may adjust the stop for either the entire lot or for part of the lot. In this case, the aggregated position will be displayed as two positions, because they will have different stop values. If a stop price is adjusted, the alert price is automatically changed to the stop price. The user, however, may change the alert price, preferably by a drill down to source the account wherein the instrument is located.

The user may update the last sale price for a security manually. Alternatively, the system is able to obtain updated sale prices automatically from sources accessed via the Internet or another network.

The system includes a protection module 110, denominated "Protect-It" herein, that allows the user to track and adjust the stop-loss price at any time, not simply upon submitting a trade. See FIG. 14. Upon initialization, step 112, the module updates price and equity data. The protection module displays, in step 114, a stop worksheet or screen (FIG. 15) that lists each position, its sell or buy stop as appropriate, and an expiration date for the stop. The user may update information, in step 116. For each stop, the user may input an expiration date, may indicate that the stop is a firm order until the user cancels it, and set the trading session to which the stop should be assigned, such as a regular exchange trading session or all global sessions around the world. The user may enter a broker for the account containing the position, or may indicate that the stop is to be a mental stop. The system may display both actual and proposed positions that a user may create within the context of an active account or portfolio.

The system includes a report module 48 that creates various reports. The module generates a risk report that quantifies a portfolio's overall planned risk in a format readily accessible to the user, preferably in a single screen or window (FIG. 16). The risk report allows the user to see the risk with each account or portfolio for each instrument type. For portfolios, instruments of similar types are typically aggregated. For example, one record is shown for the risk associated with all equities, one record is shown for the risk associated with all futures, and so on. Referring to FIG. 16, the risk report displays equity minus risk, planned risk, planned risk divided by total equity and portfolio total equity. Links may be provided to view the risk reports of each of the accounts in that portfolio.

The report also displays the user's estimated buying power and a trade date cash balance in the equity portfolio. For a futures account, the system displays an amount of withdrawable funds and a prior day's ending balance. These values may be obtained from the user's futures broker or margin clerk and updated manually by the user when received.

Figure 17:
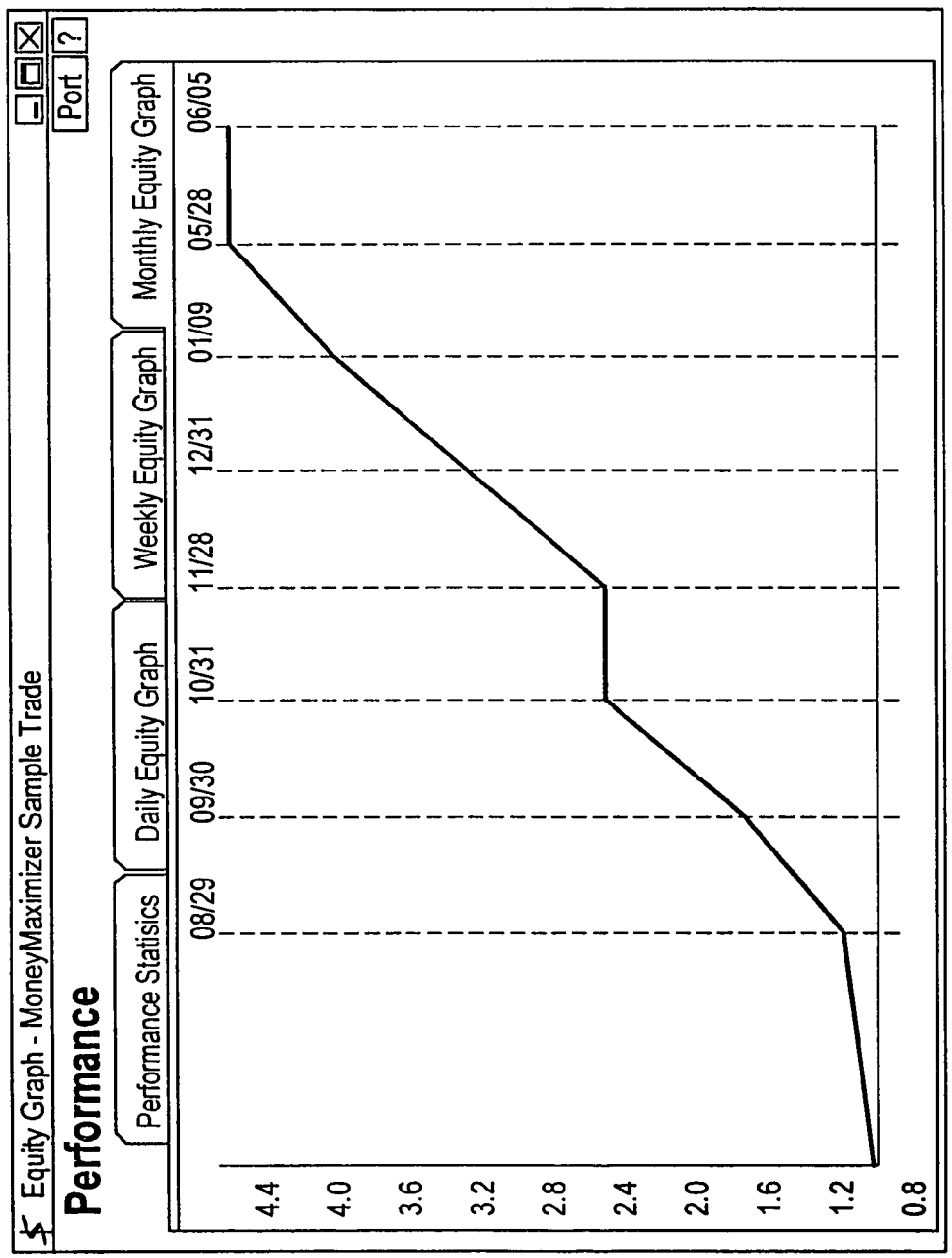
FIG. 17 is an exemplary display screen of a performance report.

The system is also capable of generating a performance report over a selected period of time, such as on a daily, weekly, monthly, quarterly, or yearly basis. This report may be viewed for an account or for a portfolio. Associated indexes may also be tracked for comparison. Simple moving averages over suitable time periods, such as ten, twenty-one, fifty, and 200 days, are also provided. The system is also capable of graphing the performance (FIG. 17), using either arithmetic or logarithmic scaling. In the preferred embodiment, performance reports utilize the VAMI (daily (period) rate of change method) to generate equity normalized graphs for the accounts and portfolios equity as well as the index comparisons.

The system provides an alerts and alarms module 120 that notifies the user upon the occurrence of certain events. As used in the present system, an alert is a notification of an instrument moving through its stop price, and an alarm is a notification of other events, such as the passing of expiration dates of stops or when a preselected price level is reached for a particular security. Receiving an alarm or alert enables the user to take prompt action, such as selling an instrument that has reached it stop, purchasing an instrument that has reached a certain limit price, or adjusting stops that have expired. The alert and alarm module may be accessed through protection or tracking modules.

For example, the system is able to send an alert to the user upon expiration of a stop. The system also sends an alert when a preselected price level is reached for a particular security. The user can set upper and lower limit alarms. If the last sale price touches the lower limit or moves below it, or if the last sale touches the upper limit or moves above it, the system automatically sends an alert to the user.

Other alerts or alarms or messages may be provided. For example, the user may receive information regarding stock splits, brokerage house merges, stock merges or consolidation and futures gearing adjustments.

In a calculator and tools module 130, the system provides the user access to various decision support tools. Typically, the system provides a stock options calculator, a futures calculator, and an index calculator.

The system's options calculator (FIG. 18) allows the user to calculate theoretical value, implied volatility, and other pertinent values used when investing in options. These calculations help the user form a judgment on whether the option is overpriced or underpriced and several significant values that effect an option's pricing.

Referring also to FIG. 8, in step 134, the option calculator (FIG. 18) can be called from the sizing module 132. The system provides the option type (stock, future, currency, or index) and symbol, the market price (for example, spot price for stock), and the exercise or strike price. The system also provides the maturity or number of days until the option may be exercised. The system preferably automatically calculates the day (the third Friday of the month expiration date) based on the entered month and year. These values may be obtained from an outside data provider. The user is also able to manually override them.

The system user also provides the simple risk-free interest rate for the period. This rate is typically a T-bill rate, and may be entered directly by the user or obtained as a default value from a T-bill rate table for the appropriate country. This rate is defined as the risk free interest the user will receive for the amount for the period between the current date and the exercise date.

The system provides a forecast for the price volatility of the security, or the volatility of the underlying stock may be obtained from a data service provider. If implied volatility is to be calculated, the system also provides the actual market price of the option. This value may also be defaulted for options on global securities from a data service provider. The user is able to override these values if desired.

The system may also provide dividends (date paid and amount), if the user would like to adjust the results to account for dividends that will be paid during the period until maturity. The system takes these future cash flows and adjusts them to a present value, which is utilized in developing the theoretical value of the option. The system uses the adjusted Black-Scholes formula, which requires entry of the number of days until the last dividend is paid. It will be appreciated that other formulas, such as Dodge and Cox, may be used.

Upon entry of the required data, the system determines and displays, in steps 136 and 138, the theoretical price, implied volatility and all other "Greek" calculations of the put or call option (Delta, Gamma, Vega, Theta, and Rho). For index options, the system includes a worksheet for maintaining data relating to the securities in and the index divisor associated with the index of interest.

The calculator and tools module 130 also provides a futures calculator that allows the user to evaluate the theoretical value of a futures contract. The user inputs the symbol of the future, the futures month code for the futures contract, the current spot market price of the cash market underlying the futures, and the T-bill rate as the risk free interest rate the user receives for the amount for the period between the current date and the exercise date. This last value may be defaulted from the T-bill rate table for the appropriate country. The user is then able to view the theoretical price for a given future and its maturity month.

The calculator and tools module 130 also provides an index options calculator. This calculator calculates theoretical value, implied volatility, and the Greeks (Delta, Gamma, Vega, Theta, and Rho) for a given index. These calculations help a user judge whether the option is overpriced or underpriced and provide several values that effect an option's pricing. The user enters the index symbol, the option codes, whether for a call or a put, the exercise month and the strike price. The index name may be entered automatically from a data service provider or the user may select the name from an index list. The price divisor for the index is typically defaulted from a data service provider or the exchange directly, but the user may change it. The index price (spot market) is the current market price of the underlying cash (spot) index. This value may be defaulted from a data service provided. The T-bill rate is the risk free interest rate the user will receive for the amount for the period between the current date and the exercise date. This value may be defaulted from the T-bill rate table for the appropriate country. The volatility of the security may be obtained from a data service provider. Similarly, the market price of the option is defaulted for the index options provided by a data provider. Optionally, the use may change this value or enter a new one.

The system includes other useful tools, such as a symbol look up table to look up stock/mutual fund, stock option, futures, and futures option symbols that are traded in local as well as international exchanges. The system provides the capability to obtain real time price quotes for symbols listed on local and international exchanges from a data service provider. Users may also watch certain stocks and track stops without setting up an account for those stocks.

The system also provides a broker look up table, a currency conversion table, futures gearing listed in relevant exchanges, the risk free 30-day bill rate for a particular country, and holiday lists for exchanges in a particular country. Users are able to maintain a list of private symbols, in which the user transacts, such as bonds.

The system provides other functionalities as well. For example, the system is capable of displaying a trade register or blotter 140, which provides a centralized data collection for daily transactions. See FIGS. 19 and 20. The user may move forward or backward one day at a time or may enter a date to jump directly to that date. A trade date drop down menu may be provided to allow the user to select from all of the dates on which a trade occurred.

The system is capable of displaying information in other formats as well. For example, the user may select a period of time over which to view transactions. The user may filter by specific securities, size risk, brokers, or SIC code. The user may select one or more accounts to view. The use can select sorting criteria for the transactions shown on the basis of date, account, broker, symbol or size.

The system may also provide educational content. For example, the system may include multimedia presentations of terminology, concepts and strategies; Frequently Asked Questions (FAQs); and forms-based, context-sensitive tooltip-like hints. The system may also provide the facility for moderated chats. Users may receive help regarding usage of the system in chat sessions. In addition, users may also chat among themselves.

On completion of the registration process, registered users may be set up with "private" sample accounts, one each for equities, futures, and other instruments, such as bonds and mortgages. A sample portfolio, which is a combination of the above accounts, may also be set up. The sample accounts provide the user with "experimental" material that complements the information in on-line tutorials and serves as a learning tool. Users may perform transactions, such as sizing, alerts, and reports, on the sample accounts and portfolio. However, these transactions are not persistent. The contents of the sample accounts and portfolio match the content in the educational material.

Figure 21:
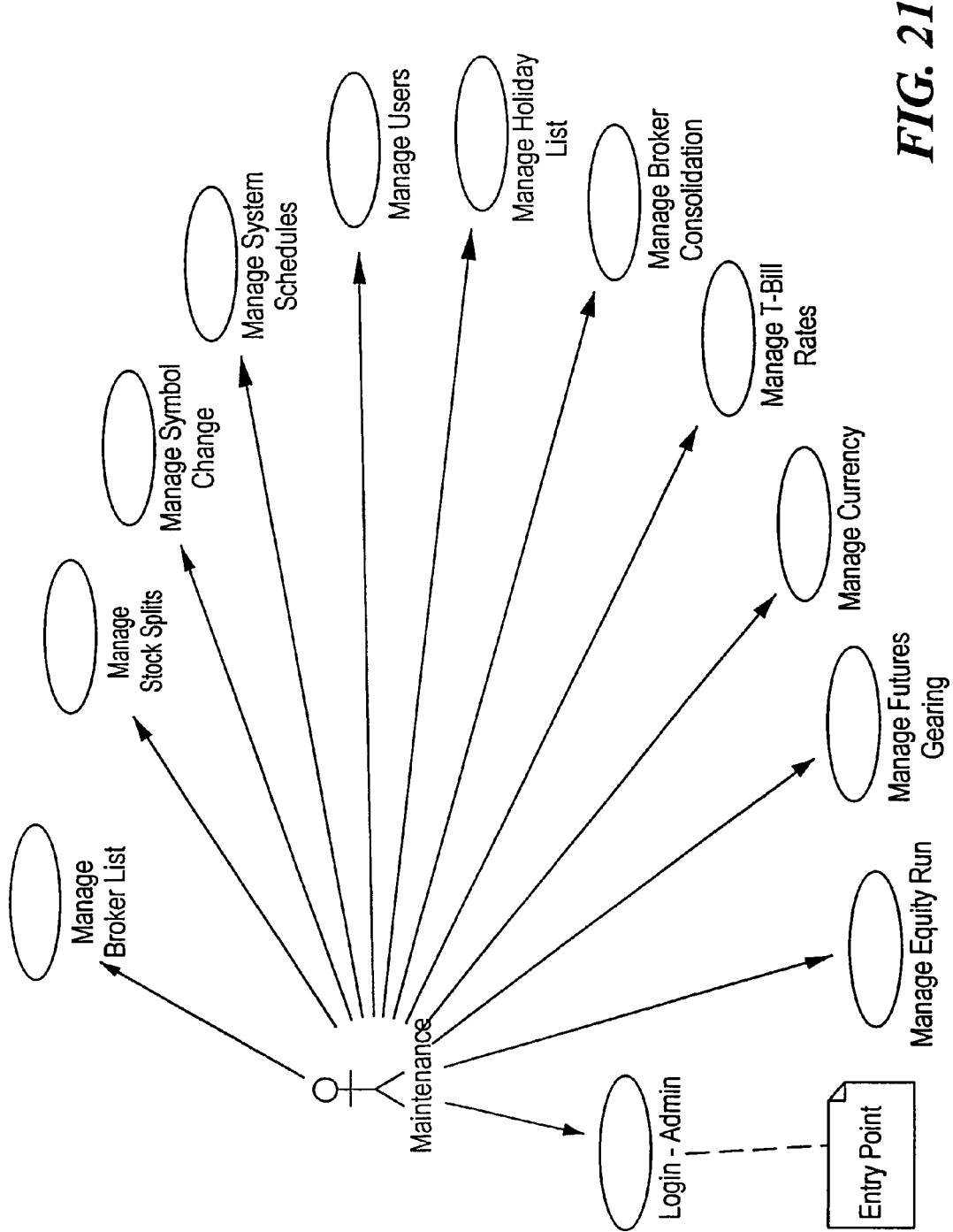
FIG. 21 is a diagrammatic representation showing administration and maintenance services provided by a system administrator.
Figure 27:
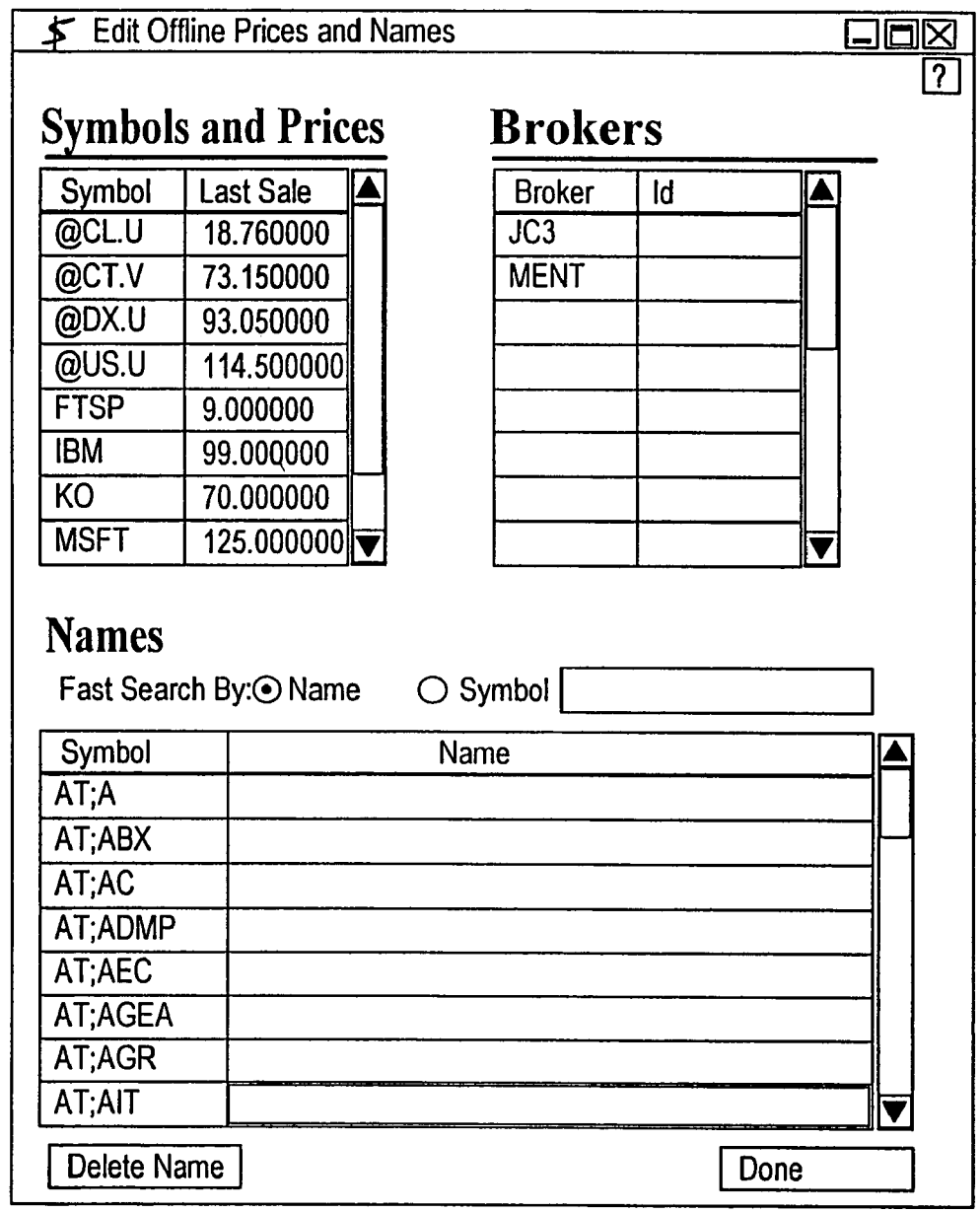
FIG. 27 is an exemplary display screen of data editing functionality of the present system.
Figures 28, 29:
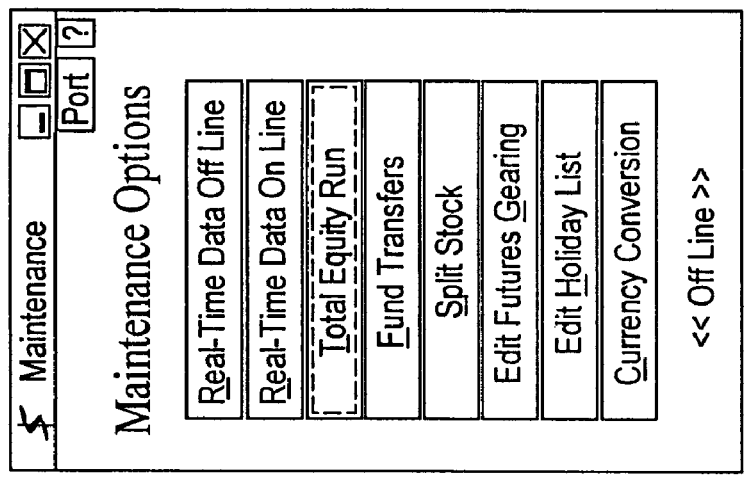
FIG. 28 is an exemplary display screen of expired stops.
FIG. 29 is an exemplary display screen of maintenance options of the present system.

Referring to FIG. 21, in the client/server context, maintenance services are preformed to maintain information. The various maintenance tasks include managing a broker list, stock splits, symbol changes, system schedules, users, holiday lists for various countries, broker consolidations, T-bill rates, currency exchange rates, futures gearing, equity runs, and login administration. FIGS. 27, 28, and 29 illustrate various exemplary screens that provide editing and maintenance functionalities.

Those skilled in the art should readily appreciate that the programs defining the functions and modules of the present invention can be delivered to a computer in many forms, including, but not limited to: (a) application service program via the World Wide Web; (b) information permanently stored on non-writable storage media (for example, read only memory devices within a computer such as ROM or CD-ROM disks readable by a computer I/O attachment); (c) information alterably stored on writable storage media (for example, floppy disks and hard drives); or (d) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein discloses. Specifically, while the preferred embodiments are discloses with reference to use within a client/server context, the present invention is generally applicable to any other context, such as a stand along application. Moreover, while the preferred embodiments are described in connection with various illustrative data structures, one skilled in the art will recognize that the system may be embodied using a variety of specific data structures. Accordingly, the invention is not to be limited by what has been particularly shown and described, except as indicated by the appended claims.

What is claimed is:

1. A method for managing portfolio risk on a computer system by a trader or investor for trading investment instruments in a real time trading environment to remain within determined risk-of-loss parameters, the method comprising:
   storing a plurality of parameters associated with an investment instrument held or to be held in a portfolio or an account on a computer-readable medium, the parameters including an identifier, a market price, a stop-loss price, and a number of shares or contracts held or to be held in the portfolio or the account;
   storing an equity value associated with the portfolio or the account;
   determining a point risk value of the instrument, the point risk value comprising an intermediate value multiplied by the number of shares or contracts, the intermediate value comprising the market price minus the stop-loss price for a long transaction or the market price plus the stop-loss price for a short transaction;
   determining a number of shares or contracts held or to be held in the portfolio or the account associated with the point risk value for a selected size risk value, the number determined by multiplying the selected size risk value by the equity value and dividing by the point risk value;
   repeating the step of determining a number of shares or contracts held or to be held in the portfolio or the account for a plurality of selected size risk values; and
   displaying a plurality of risk scenarios corresponding to the plurality of selected size risk values, the displaying step including displaying the number of shares or contracts held or to be held in the portfolio or the account corresponding to each of the plurality of size risk values.

2. The method of claim 1, further comprising:
   determining a market value associated with each of the plurality of risk scenarios and displaying the market values.

3. The method of claim 1, further comprising:
   storing the plurality of parameters associated with a plurality of investment instruments;
   storing a total equity value for the portfolio;
   determining for each investment instrument a risk value, the risk value comprising an intermediate value of the market price minus the stop-loss price for a long transaction or the market price plus the stop-loss price for a short transaction, the intermediate value multiplied by the number of shares or contracts associated with each investment instrument;
   determining a sum of risk values of the plurality of investment instruments, the sum comprising a planned risk value;
   determining the equity value by subtracting the planned risk value from the total equity value for the portfolio; and
   displaying the equity value.

4. The method of claim 1, further comprising:
   determining a ratio of the planned risk value to the total equity value; and
   displaying the ratio.

5. The method of claim 1, further comprising:
   storing a user's buying power value; and
   displaying the user's buying power value.

6. The method of claim 5, further comprising:
   determining a plurality of market values, each market value associated with each of the plurality of risk scenarios; and
   displaying a plurality of new buying power values, each new buying power value corresponding to the user's buying power minus each of the plurality of market values.

7. The method of claim 1, further comprising:
   storing a commission and a skid associated with the investment; and
   in the step of determining the point risk, the intermediate value comprises the market price minus the stop-loss price plus the commission plus the skid for a long transaction, or the intermediate value comprises the market price plus the stop-loss price minus the commission minus the skid for a short transaction.

8. The method of claim 1, wherein the investment instruments includes stocks, mutual funds, options, futures, futures options, bonds, or mortgages.

9. The method of claim 1, wherein the computer system comprises a client server computer system.

10. A system for managing investment portfolio risk on a computer system by a trader or investor for trading investment instruments in a real time trading environment to remain within determined risk-of-loss parameters, the system comprising:
    at least one processor;
    at least one memory, the memory containing a plurality of parameters associated with an investment instrument held or to be held in a portfolio or in an account on a computer-readable medium, the parameters including an identifier, a market price, a stop-loss price, a number of shares or contracts held or to be held in the portfolio or the account, and an equity value associated with the portfolio or the account; and a utility executable by the at least one processor and operable to:

determine a point risk value of the instrument, the point risk value comprising an intermediate value multiplied by the number of shares or contracts, the intermediate value comprising the market price minus the stop-loss price for a long transaction or the market price plus the stop-loss price for a short transaction, determine a number of shares or contracts held or to be held in the portfolio or the account associated with the point risk value for a selected size risk value, the number determined by multiplying the selected size risk value by the equity value and dividing by the point risk value, repeat the step of determining a number of shares or contracts held or to be held in the portfolio or the account for a plurality of selected size risk values, and display a plurality of risk scenarios corresponding to the plurality of selected size risk values, the displaying step including displaying the number of shares or contracts held or to be held in the portfolio or the account corresponding to each of the plurality of size risk values.

11. The system of claim 10, wherein the utility is further operable to determine a market value associated with each of the plurality of risk scenarios and display the market values.

12. The system method of claim 10, wherein further comprising:

the memory further contains the plurality of parameters associated with a plurality of investment instruments and a total equity value for the portfolio; and the utility is further operable to:

determine for each investment instrument a risk value, the risk value comprising an intermediate value of the market price minus the stop-loss price for a long transaction or the market price plus the stop-loss price for a short transaction, the intermediate value multiplied by the number of shares or contracts associated with each investment instrument, determine a sum of risk values of the plurality of investment instruments, the sum comprising a planned risk value, determine the equity value by subtracting the planned risk value from the total equity value for the portfolio, and display the equity value.

13. The system of claim 10, wherein the utility is further operable to determine a ratio of the planned risk value to the total equity value and display the ratio.

14. The system of claim 10, wherein:

the memory further contains a user's buying power value; and the utility is further operable to display the user's buying power value.

15. The system method of claim 14, wherein the utility is further operable to:

determine a plurality of market values, each market value associated with each of the plurality of risk scenarios; and display a plurality of new buying power values, each new buying power value corresponding to the user's buying power minus each of the plurality of market values.

16. The system of claim 10, wherein:

the memory contains a commission and a skid associated with the investment; and the utility is operable to determine the point risk, the intermediate value comprising the market price minus the stop-loss price plus the commission plus the skid for a long transaction, or the intermediate value comprises the market price plus the stop-loss price minus the commission minus the skid for a short transaction.

17. The system of claim 10, wherein the investment instruments includes stocks, mutual funds, options, futures, futures options, bonds, or mortgages.

18. The system of claim 10, wherein the computer system comprises a client server computer system.

* * * * *